(12) United States Patent
Mittal et al.

(10) Patent No.: US 11,683,673 B2
(45) Date of Patent: *Jun. 20, 2023

(54) SYSTEMS AND METHODS FOR SECURE PAIRING AUTHORIZATION OF PASSENGER APPLICATIONS AND VEHICLES

(71) Applicant: Uber Technologies, Inc., San Francisco, CA (US)

(72) Inventors: Atibhav Mittal, San Francisco, CA (US); Ashwin Neurgaonkar, San Francisco, CA (US); Nihal Reddy Pathuri, San Francisco, CA (US); Zelin Liu, San Francisco, CA (US); Zhuofu Li, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,306

(22) Filed: Oct. 11, 2021

(65) Prior Publication Data

US 2022/0070641 A1 Mar. 3, 2022

Related U.S. Application Data

(63) Continuation of application No. 17/068,391, filed on Oct. 12, 2020, now Pat. No. 11,159,931.

(Continued)

(51) Int. Cl.
*H04W 4/80* (2018.01)
*H04W 4/50* (2018.01)
(Continued)

(52) U.S. Cl.
CPC ............... *H04W 4/80* (2018.02); *H04W 4/50* (2018.02); *H04W 12/06* (2013.01);
(Continued)

(58) Field of Classification Search
CPC ......... H04W 4/80; H04W 4/50; H04W 12/06; H04W 4/024; H04W 4/48; G06F 3/04842
See application file for complete search history.

(56) References Cited

U.S. PATENT DOCUMENTS 10,486,646 B2 11/2019 Ledvina et al.
10,613,537 B2 4/2020 Matthiesen et al.
(Continued)

FOREIGN PATENT DOCUMENTS

EP 3628975 4/2020

OTHER PUBLICATIONS

"U.S. Appl. No. 17/068,391, Notice of Allowance dated Jun. 10, 2021", 10 pgs.

(Continued)

*Primary Examiner* — David Bilodeau
(74) *Attorney, Agent, or Firm* — Schwegman Lundberg & Woessner, P.A.

(57) ABSTRACT

Systems and methods of the present disclosure are directed to a method for facilitating pairing of multiple entities. The method can include obtaining a vehicle pairing request for an autonomous vehicle of a vehicle provider comprising vehicle identification data. The method can include determining a temporary pairing code associated with the autonomous vehicle. The method can include providing the temporary pairing code to the vehicle provider. The method can include obtaining a device pairing request via an application executed by a user device, the device pairing request comprising the temporary pairing code and an operational certificate, the operational certificate comprising device identification data associated with the user device. The method can include pairing the user device and the autonomous vehicle based at least in part on the device pairing request.

20 Claims, 8 Drawing Sheets

Related U.S. Application Data

(60) Provisional application No. 63/073,606, filed on Sep. 2, 2020.

(51) Int. Cl.
  *H04W 12/06* (2021.01)
  *H04W 4/024* (2018.01)
  *G06F 3/04842* (2022.01)
  *H04W 4/48* (2018.01)

(52) U.S. Cl.
  CPC ......... *G06F 3/04842* (2013.01); *H04W 4/024* (2018.02); *H04W 4/48* (2018.02)

(56) References Cited

U.S. PATENT DOCUMENTS

| | | |
|---|---|---|
| 10,613,548 B2 | 4/2020 | Zhang et al. |
| 10,839,340 B2 | 11/2020 | Skaaksrud |
| 11,159,931 B1 | 10/2021 | Mittal et al. |
| 2016/0359629 A1* | 12/2016 | Nadathur ................ H04L 9/006 |
| 2017/0124781 A1 | 5/2017 | Douillard et al. |
| 2018/0255276 A1 | 9/2018 | Shou et al. |
| 2019/0121357 A1 | 4/2019 | Zhang et al. |
| 2019/0283239 A1 | 9/2019 | Skaaksrud et al. |
| 2019/0385119 A1 | 12/2019 | Chang et al. |
| 2020/0037379 A1* | 1/2020 | Zellen ..................... H04W 4/80 |
| 2020/0084193 A1 | 3/2020 | Beaurepaire et al. |
| 2020/0168100 A1 | 5/2020 | Quitoriano et al. |
| 2020/0245144 A1* | 7/2020 | Sandu ................... H04W 12/06 |

OTHER PUBLICATIONS

"U.S. Appl. No. 17/068,391, 312 Amendment filed Sep. 10, 2021", 9 pgs.

"U.S. Appl. No. 17/068,391, PTO Response to Rule 312 Communication mailed Sep. 30, 2021", 2 pgs.

"International Application Serial No. PCT US2021 048806, International Search Report dated Dec. 21, 2021", 5 pgs.

"International Application Serial No. PCT US2021 048806, Written Opinion dated Dec. 21, 2021", 6 pgs.

\* cited by examiner

SYSTEMS AND METHODS FOR SECURE PAIRING AUTHORIZATION OF PASSENGER APPLICATIONS AND VEHICLES

RELATED APPLICATION

The present application is a continuation of U.S. patent application Ser. No. 17/068,391 filed on Oct. 12, 2020, which is based on and claims benefit of U.S. Provisional Patent Application No. 63/073,606 having a filing date of Sep. 2, 2020, both of which are incorporated by reference herein in their entirety for all purposes.

FIELD

The present disclosure relates generally to vehicle services and, more particularly, secure pairing between passenger-oriented applications and service vehicles.

BACKGROUND

Ensuring security and passenger safety is a key focus for service entities (e.g., autonomous transportation services, etc.). In particular, to provide an optimal level of secure authorization, service entities generally must generate and maintain authorized pairings between a plurality of entities. As an example, a transportation service entity may generate and maintain an authorized pairing between a vehicle and a computing device configured to display details of the transportation service to a user of the service.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method can include obtaining, by a computing system comprising one or more computing devices, a vehicle pairing request for an autonomous vehicle of a vehicle provider, the vehicle pairing request comprising vehicle identification data. The method can include determining, by the computing system based at least in part on the vehicle identification data, a temporary pairing code associated with the autonomous vehicle. The method can include providing, by the computing system, the temporary pairing code to the vehicle provider. The method can include obtaining, by the computing system, a device pairing request via an application executed by a user device, the device pairing request comprising the temporary pairing code and an operational certificate, the operational certificate comprising device identification data associated with the user device. The method can include pairing, by the computing system, the user device and the autonomous vehicle based at least in part on the device pairing request.

Another example aspect of the present disclosure is directed to a computing system. The computing system can include one or more processors. The computing system can include one or more tangible, non-transitory, computer readable media that collectively store instructions that when executed by the one or more processors cause the computing system to perform operations. The operations can include obtaining a vehicle pairing request for an autonomous vehicle of a vehicle provider, the vehicle pairing request comprising vehicle identification data. The operations can include determining that the vehicle identification data corresponds to previously stored identification data. The operations can include determining, based at least in part on the vehicle identification data, a temporary pairing code associated with the autonomous vehicle for which the vehicle identification data corresponds to previously stored identification data. The operations can include providing the temporary pairing code to the vehicle provider. The operations can include obtaining a device pairing request via a user device, the device pairing request comprising the temporary pairing code and device identification data associated with the user device. The operations can include pairing the user device and the autonomous vehicle based at least in part on the device pairing request.

Another example aspect of the present disclosure is directed to one or more tangible, non-transitory, computer readable media that collectively store instructions that when executed by one or more processors cause the one or more processors to perform operations. The operations can include obtaining a vehicle pairing request for a vehicle of a vehicle provider, the vehicle pairing request comprising vehicle identification data. The operations can include determining, based at least in part on the vehicle identification data, a temporary pairing code associated with the vehicle. The operations can include providing the temporary pairing code to the vehicle provider. The operations can include obtaining a device pairing request from a user device, the device pairing request comprising the temporary pairing code and an operational certificate, the operational certificate comprising device identification data associated with the user device. The operations can include pairing the user device and the vehicle based at least in part on the device pairing request. The operations can include, for one or more iterations, obtaining an authentication request from the user device, the authentication request comprising the device identification data and the vehicle identification data. The operations can include, for one or more iterations, determining that the authentication request data corresponds to a stored pairing between the user device and the autonomous vehicle. The operations can include, for one or more iterations, providing a backend authentication certificate to the user device, the backend authentication certificate configured to provide access to a backend service of the computing system.

Other example aspects of the present disclosure are directed to other systems, methods, vehicles, apparatuses, tangible non-transitory computer-readable media, and the like for vehicle-device pairing.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
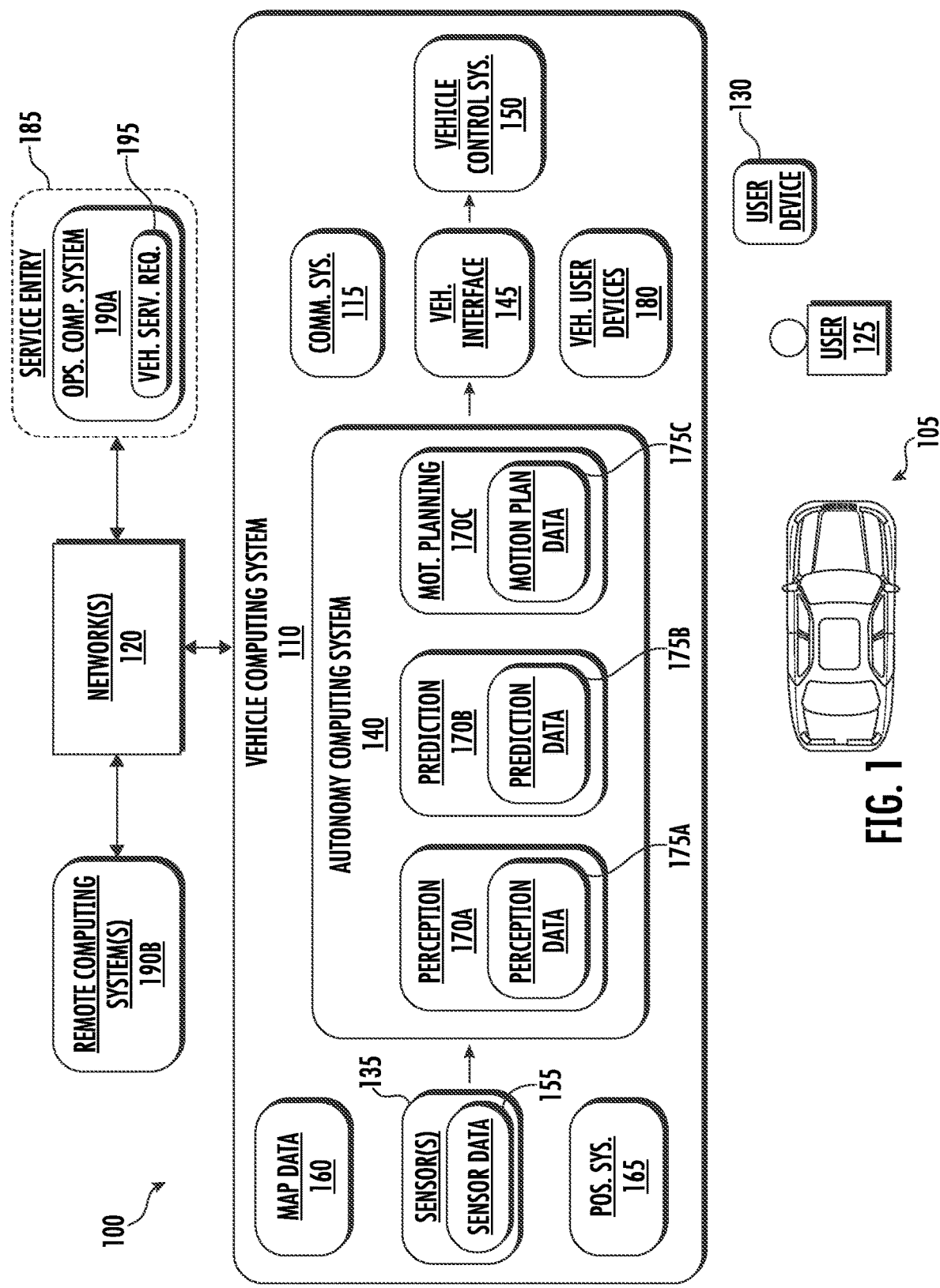
FIG. 1 depicts a block diagram of an example system for controlling and communicating with a vehicle according to example embodiments of the present disclosure.

Example aspects of the present application are directed to improved systems and methods for pairing multiple entities for safe and secure conveyance of a vehicle service. More particularly, the systems and methods of the present disclosure provide a computationally efficient and secure manner of pairing and authenticating a user device (e.g., an application downloaded thereon) with a vehicle (e.g., an autonomous vehicle). To help do so, an operations computing system of a service entity (e.g., an entity that offers and/or coordinates vehicle service(s), etc.) can obtain a vehicle pairing request that identifies a vehicle. The vehicle can be an autonomous vehicle utilized by and/or available to the service entity for providing vehicle services (e.g., transportation services, delivery services, courier services, etc.). The autonomous vehicle can be, for example, included in a fleet of a third party vehicle provider that offers its vehicles to the service entity. Based on the vehicle pairing request, the operations computing system can determine that the vehicle (and/or a vehicle provider or vehicle operator associated therewith) corresponds to previously stored identification data (e.g., to ensure that the vehicle, vehicle provider, and/or the operator is known to the service entity, etc.). The operations computing system can determine a temporary pairing code (e.g., a 6-number PIN code, etc.) for the vehicle and can provide the temporary pairing code to the vehicle provider. This can include sending the temporary pairing code to a computing system of the vehicle provider and/or a user device of a vehicle operator associated with the vehicle.

After providing the temporary pairing code, the operations computing system can obtain a device pairing request via a user device (e.g., a passenger-facing tablet included in the vehicle, etc.). The device pairing request can include the temporary pairing code and an operational certificate that includes device identification data (e.g., a previously provided certificate that authorizes the user device to communicate with the operations computing system, etc.). The operations computing system can pair the user device and the vehicle based on the device pairing request. More particularly, the operations computing system can, in some implementations, store device pairing data that indicates an association between the user device and the vehicle. In some implementations, the operations computing system can also store data indicative of an association with the user device, the vehicle, and a vehicle provider and/or operator. In such fashion, the operations computing system of the vehicle service provider can securely and efficiently generate an authorized pairing between multiple entities (e.g., the user device, the vehicle, the provider/operator, etc.), therefore ensuring that all aspects of the vehicle service remain authorized and further optimizing the safety and security of the provided vehicle service.

It should be noted that although the present disclosure is described primarily in the context of a service entity and the parties generally associated with the provision of vehicle transportation services (e.g., a vehicle provider, a vehicle, a user, a user device, etc.), aspects of the present disclosure are not limited to this context. Rather, systems and methods of the present disclosure can provide authorized and secure pairing of multiple entities in a variety of vehicle service implementations. As an example, systems and methods of the present disclosure can be used to securely pair a service entity and/or vehicle provider and a vehicle for provision of a delivery service (e.g., a food delivery service, a courier service, etc.). As yet another example, systems and methods of the present disclosure can be used to securely pair an autonomous vehicle of a vehicle provider and a vehicle provider computing device with the service entity (e.g., to facilitate fulfillment by vehicle provider(s) of vehicle services offered by a service entity, etc.). In such fashion, systems and methods of the present disclosure can be utilized in a broad variety of applications to more safely and securely pair multiple entities associated with the provision of services by a service entity.

An autonomous vehicle (e.g., ground-based vehicle, aerial vehicle, light electric vehicle, and/or another type of vehicle) can include various systems and devices configured to control the operation of the autonomous vehicle. For example, the autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. This can include, for example, detecting of object(s) (e.g., pedestrians, vehicles, bicycles/bicyclists, etc.) within the vehicle's surrounding environment, predicting the future motion trajectory of those objects, and planning the vehicle's motion to avoid interference with the object(s). Moreover, the autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

The autonomous vehicles utilized by the service entity to provide vehicle services can be associated with a vehicle fleet of a vehicle provider. A vehicle provider can include for, example, the service entity or a third party vehicle provider. A fleet can include one or a plurality of autonomous vehicles. The plurality of autonomous vehicles can be associated with a single entity/party. For example, the service entity may own, lease, etc. a fleet of autonomous vehicles that can be managed by the service entity (e.g., its backend system clients) to provide one or more vehicle services. An autonomous vehicle utilized to provide the vehicle service(s) can be included in this fleet of the service entity. Such autonomous vehicles may be referred to as "service entity autonomous vehicles" or "first party autonomous vehicles" and can be included in a "first party autonomous vehicle fleet." In some implementations, an autonomous vehicle can be associated with a third party vehicle provider such as, for example, an individual, an original equipment manufacturer (OEM), a third party vendor, or another entity. These autonomous vehicles may be referred to as "third party autonomous vehicles" and can be included in a "third party autonomous vehicle fleet." Even though such an autonomous vehicle may not be included in the fleet of autonomous vehicles of the service entity, the service entity's computing infrastructure can allow the autonomous vehicle(s) associated with a third party to still be utilized to provide the vehicle services offered by the service entity, access the service entity's back-ends systems, etc.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such services can facilitate secure, bidirectional communications between autonomous vehicles and/or the service entity's operations computing system.

The service platform can allow an autonomous vehicle to obtain data from and/or communicate data to the operations computing system. By way of example, a user can provide (e.g., via a user device) a request for a vehicle service to the operations computing system (and/or another system associated therewith). The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The systems and methods of the present disclosure can allow for the operations computing system to efficiently pair and authenticate a user device with an autonomous vehicle. The user device can be, for example, a user device that is permanently or temporarily located onboard the autonomous vehicle (e.g., an in-cabin tablet for a passenger, vehicle operator, etc.). This pairing and authentication process can improve the experience of a user onboard the autonomous vehicle (e.g., a passenger for transportation service, an onboard vehicle operator, etc.) as well as the ability of the autonomous vehicle to effectively provide vehicle service(s).

To initiate the pairing process, the operations computing system of the service entity can obtain a vehicle pairing request for a vehicle (e.g., an autonomous vehicle, etc.). The vehicle pairing request can be obtained from a variety of sources. As an example, the operations computing system may obtain a vehicle pairing request from a computing system of a vehicle provider. This can include, for example, a third party vehicle provider associated with the autonomous vehicle to be paired. As yet another example, the operations computing system may obtain a vehicle pairing request from another computing device, computing system, and/or service (e.g., a backend service of the computing system, a vehicle pairing service, a driver authorization service, etc.) associated with the service entity (e.g., external or internal to the computing system, etc.). For example, the computing system (e.g., the operations computing system) can obtain a vehicle pairing request from a backend service of the computing system.

The vehicle pairing request can include vehicle identification data. The vehicle identification data can be configured to identify a specific identity of the vehicle (e.g., a vehicle type, a manufacturer brand and/or model, a color, a year of manufacture, one or more features of the vehicle, etc.). As an example, the vehicle identification data can be or otherwise include a unique identification hash generated using a cryptographic hashing scheme based at least in part on specific identification features of the vehicle (e.g., manufacturer assigned VIN's, vehicle features, a vehicle color, etc.). It should be noted that the vehicle identification data can, in some implementations, identify the vehicle as a vehicle known to be associated with the service entity and/or a third party vehicle provider. As an example, the vehicle identification data may correspond to identification data previously stored by the service entity that indicates the vehicle is owned by the service entity. As another example, the vehicle identification data may correspond to identification data previously stored by the service entity that indicates the vehicle is owned by a trusted vehicle provider. As such, the vehicle be utilized to facilitate provision of vehicle service(s) for the service entity while also being provided by a vehicle provider.

In some implementations, the vehicle identification data can be or otherwise include a unique identifier from a manufacturer of the vehicle and/or a provider of the vehicle (e.g., a manufacturer assigned VIN, a unique identifier assigned by a vehicle provider, etc.). As such, the vehicle identification data can be or otherwise include data that specifies the exact identity of the vehicle to the operations computing system of the service entity, while also conveying information regarding the vehicle (e.g., a seating capacity, vehicle features, vehicle range, etc.).

In some implementations, the vehicle pairing request can be associated with a vehicle provider. For instance, the vehicle pairing request can include vehicle operator identification data. The vehicle provider identification data may be or otherwise include valid vehicle operation credentials. As an example, the vehicle provider identification data may be or otherwise include a driver's license number that permits a vehicle operator (e.g., associated with the vehicle provider, etc.) to legally operate the vehicle. As another example, the vehicle provider identification data may be or otherwise include a pilot's license registration number that permits the vehicle operator to legally pilot an aircraft (e.g., a helicopter, VTOL craft, etc.). In some implementations, the vehicle provider identification data can include operation credentials that have previously been provided to the vehicle provider (e.g., from the service entity). This can include, for example, username, password(s), identifier(s) (e.g., series of character, etc.), and/or other information for helping to determine that the vehicle provider is authorized.

Based at least in part on the vehicle identification data, the operations computing system can generate a temporary pairing code associated with the vehicle. More particularly, the temporary pairing code can be associated with the vehicle or both the vehicle and the vehicle provider. The temporary pairing code can be generated in any format (e.g., a 4-digit numeric code, a 6-digit alphanumeric code, an encoding, etc.). As an example, the temporary pairing code may be a machine-readable visual encoding (e.g., a QR code, a proprietary QR-like visual encoding, etc.). As another example, the temporary pairing code can be a spoken utterance (e.g., a phrase or series of words that can be spoken by the vehicle operator to an associated computing device, etc.). As yet another example, the temporary pairing code can be or otherwise include instruction(s) to the vehicle provider (e.g., a vehicle operator associated therewith) to provide biometric authorization data (e.g., facial recognition data, speech recognition data, fingerprint recognition data, etc.). It should be noted that the temporary pairing code can be generated by the computing system using any type of cryptographic function (e.g., a cryptographic hash function, etc.).

As described, the temporary pairing code generated by the operations computing system may only be valid for a specified amount of time. As an example, the temporary pairing code may be valid for 20 minutes. As another example, the temporary pairing code may be valid for 5 minutes. Additionally, or alternatively, in some implementations, the temporary pairing code can lose validity based on a number of incorrect codes received by the computing system. As an example, if the operations computing system receives four sequentially incorrect temporary pairing codes from a vehicle provider (e.g., and/or a vehicle operator associated therewith), the generated temporary pairing code can be invalidated.

The operations computing system can provide the temporary pairing code to the vehicle provider. More particularly, the temporary pairing code can be provided to a computing system of the vehicle provider and/or to a computing device of a vehicle operator associated with the vehicle provider (e.g., a smartphone device of the vehicle operator, etc.). As an example, the operations computing system may provide the temporary pairing code to a smartphone device of a vehicle operator associated with the vehicle provider (e.g., to manually enter the pairing code in a user device that is remote or local to the vehicle, etc.). As another example, the operations computing system may provide the temporary pairing code to a computing service of the vehicle provider (e.g., a computing device, computing system, a backend service of a computing system, a vehicle pairing service, a driver authorization service, etc.).

The operations computing system can obtain a device pairing request via a user device (e.g., a passenger-facing computing device inside the cabin of the vehicle, etc.). The pairing request can be communicated directly or indirectly (e.g., via an intermediary) to the operations computing system. The device pairing request can include the temporary pairing code and an operational certificate (e.g., a previously provided certificate that authorizes the user device to communicate with the operations computing system, etc.). The operational certificate can include device identification data that identifies the user device. As an example, the device identification data may be or otherwise include a unique cryptographic identifier for the user device. As another example, the device identification data may be or otherwise include a combination or hash of one or more conventional identifiers of the user device (e.g., one or more of a device ID, a hardware ID, an I.P. address, a MAC address, etc.).

It should be noted that the user device can be any type of computing device, and can be utilized in any manner as related to the provided service. As an example, the user device can be a mobile device (e.g., a tablet, a smartphone, a smart display, etc.). For example, the user device can be a tablet located in the interior of the vehicle so that the user device is accessible to one or more passengers of the vehicle (e.g., to facilitate selection of user interface elements on a display of the user device, etc.). As another example, the user device can be a computing device incorporated in the vehicle computing system of the vehicle. For example, the user device can be a computing device (e.g., a discrete portion of computational resources of the vehicle computing device, etc.) that is communicatively connected to display device(s) located in the interior of the vehicle and/or on the exterior of the vehicle. For example, the user device may be or otherwise be included in the vehicle computing system of an autonomous vehicle, and may be communicatively coupled to a display device on the exterior of the vehicle (e.g., to facilitate selection of user interface elements by persons associated with delivery of an item such as a food order, etc.).

In some implementations, prior to obtaining the device pairing request, the operations computing system can obtain a device authorization certificate from the user device. The device authorization certificate can be a certificate previously provided to the user device that authorizes the user device to communicate with the operations computing system and/or one or more services of the operations computing system (e.g., a licensing service, an edge gateway service, a backend service, etc.). In some implementations, the device authorization certificate can be provided by the operations computing system to the user device prior to generating the temporary pairing code associated with the vehicle. As an example, the device authorization certificate can be a permanent authorization certificate provided to the user device when registering the user device with the service entity and/or the vehicle provider (e.g., a "birth" authorization certificate, etc.). In some implementations, the device authorization certificate is configured to authorize the user device to obtain the operational certificate.

In some implementations, the operations computing system, in response to obtaining the device authorization certificate, can provide the operational certificate to the user device. In such fashion, the operational certificate can be provided to the user device if the user device is previously "known" to the operations computing system (e.g., has been previously provided an authorization certificate, etc.), therefore ensuring that the user device is properly authorized before pairing the user device with the vehicle or the vehicle and one or more of the vehicle provider or the vehicle operator.

In some implementations, the operational certificate can be configured to expire after a certain amount of time. As an example, the operations computing system can obtain a device authorization certificate from the user computing device. In response, the operations computing system can provide an operational certificate that permits secure communication with the operations computing system for 24 hours. In such fashion, the operations computing system can provide time-limited operational certificates to significantly decrease the risk of a security failure associated with the operational certificate and/or the device authorization certificate.

Based at least in part on the device pairing request, the operations computing system can pair the vehicle with the user device. For instance, the operations computing system can store device pairing data indicative of an association between the computing device and the vehicle. Additionally, or alternatively, the operations computing system can store device pairing data indicative of an association between the computing device and/or the vehicle, and the vehicle operator. More particularly, the operations computing system can store data that indicates a secure and authorized pairing between the multiple entities (e.g., the user device, the vehicle, the vehicle provider, the vehicle operator, etc.). The operations computing system can store the device pairing data in an associated memory (e.g., database, internal storage device, third-party or first-party cloud storage service, etc.). In some implementations, the device storage data can be temporally limited in the same manner as the operational certificate (e.g., can be valid for a specified amount of time, etc.).

In some implementations, the operations computing system can provide data indicative of the storage to the computing device for display at the user device through an application associated with the service entity. As an example, the user device can execute or otherwise can be executing an application configured to convey information regarding services of the service entity to passenger(s) and/or vehicle operator(s) of the vehicle (e.g., a trip duration, an estimated time of arrival, maintenance status, route information, visualizations of vehicle autonomy actions, etc.). The data can be sent to the application for display within the application. For example, after successfully storing the device pairing data, the operations computing system can provide data to the application executed by the user device that displays an alert indicating that the pairing is complete. In such fashion, the vehicle provider, the vehicle operator, and/or passenger(s) of the vehicle can be alerted that the secure pairing and authorization between device and vehicle (and potentially the vehicle provider/vehicle operator) is successful.

In some implementations, the operations computing system can determine that at least a portion of the vehicle pairing request corresponds to previously stored identification data. More particularly, the operations computing system can determine that the vehicle identification data and/or the vehicle provider identification data corresponds to previously stored data that indicates that the vehicle is "known" to the service entity (e.g., is authorized to facilitate provision of services for the service entity, etc.). As an example, the operations computing system can determine that the vehicle identification data corresponds to previously stored identification data for a vehicle owned by/dedicated to the service entity. As another example, the operations computing system can determine that the vehicle identification data corresponds to previously stored identification data for a vehicle owned by/dedicated to a third-party vehicle provider that is trusted by the service entity. As yet another example, the operations computing system may determine that vehicle operator identification data corresponds to previously stored identification data for a user (e.g., an employee, independent contractor, etc.) of the service entity or a third-party vehicle provider. In such fashion, the operations computing system can make a determination that the vehicle is known and previously established as secure by the service entity.

In some implementations, the operations computing system can obtain an authentication request from the user device. The authentication request can include the device identification data. The operations computing system can determine that the authentication request data corresponds to the previously stored association between the user device and the vehicle. More particularly, the operations computing system can determine that the combination of the vehicle and the user device accurately corresponds to the previously stored and authorized pairing. Based on the secure and authorized correspondence between the obtained data and the stored association, the operations computing system can provide a backend authentication certificate to the user device. The backend authentication certificate can be configured to provide access to a backend service of the operations computing system (e.g., one or more services of the operations computing system that are inaccessible through externally-facing interfaces without authorization, etc.). As an example, the backend authentication certificate can be configured to provide access to an edge gateway of the operations computing system (e.g., a gateway configured to block unauthorized access to internal systems of the computing system, etc.).

In some implementations, the operations computing system can obtain the previously provided backend authentication certificate and a service status request from the user device (e.g., the user device associated with the vehicle). The service status request can be a request for a status of a service currently being provided by the vehicle and/or a service scheduled to be provided by the vehicle. The service provided by the vehicle can be any service offered by the service entity that can be provided by a vehicle provider (e.g., a delivery service, a transportation service, a pooled vehicle service, etc.). As an example, the service status request may request the status of a transportation service that is currently being provided by the vehicle. As another example, the service status request may request a pooled vehicle service, which can be utilized to concurrently fulfill a plurality of different vehicle service requests (e.g., a plurality of transportation services, a plurality of delivery services, a mixed plurality of both transportation and delivery services, etc.).

In some implementations, the operations computing system can provide service status data to the user device. More particularly, the operations computing system can use its backend service to provide the service status to the user device (e.g., facilitated by the backend authentication certificate provided by the user device, etc.). The service status data can describe any previous, current, or planned aspect of the service (e.g., mapping data for an area around a current location of the vehicle, the current location of the vehicle, a planned route of the vehicle, an estimated service completion time, a destination address, passenger directions, etc.). Further, the service status data can be configured for display at the user device in the same or a similar manner to the data indicative of the successful pairing (e.g., as a user interface element in an application associated with the service entity that is executed by the user device, etc.). As an example, the service status data may include a destination address and passenger directions configured to direct a passenger of the vehicle from a vehicle destination to a final passenger destination. For example, the passenger directions may be configured to direct a passenger of the vehicle from an airport drop-off point to a planned terminal of the airport. The vehicle service can provide service status data for a multimodal transportation service (e.g., a transportation service utilizing multiple modes of transportation, etc.). This can include information associated with one or more subsequent transportation legs of a multi-modal itinerary (e.g., aircraft information for an air transport leg, ground-based vehicle information for a subsequent ground-based vehicle leg, etc.). As another example, the service status data can include a current seating configuration of the vehicle, and can additionally include user interface elements to adjust one or more parameters of the seating configuration of the vehicle (e.g., adjusting an angle and/or position of seats, adjusting a second row of seats to a table configuration, etc.).

In some implementations, the operations computing system can obtain a service adjustment request from the user device. The service adjustment request can be indicative of a service adjustment selected by a user (e.g., using one or more user interface elements provided by a service entity application executed on the user device, etc.). Based on the service adjustment data, the operations computing system can provide service adjustment data to the user device using the backend service of the computing system. More particularly, the service adjustment data can be configured to adjust one or more aspects of the service provided by the vehicle in accordance with the service adjustments selected by the user (e.g., as indicated by the service adjustment request, etc.). The service adjustment data can include any adjustment that can be selected by a user for the service being provided (e.g., a service stop request, a destination modification request, a service support request, a service safety request, etc.). As an example, the service adjustment data may include an adjustment from a first destination to a second destination. As another example, the service adjustment data may include an adjustment that stops the vehicle along its current route. In such fashion, the vehicle service provided by the service entity and/or a vehicle provider associated with the service entity can be dynamically adjusted according to service adjustment requests of a user of the service.

Various means can be configured to perform the methods and processes described herein. For example, a computing system can include vehicle pairing request obtaining unit(s), data correspondence determination unit(s), temporary pairing code generation unit(s), temporary pairing code providing unit(s), pairing request obtaining unit(s), device pairing data storing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means can be configured to obtain data (e.g., a vehicle pairing request) from a vehicle provider that includes identification data for a vehicle. A vehicle pairing request obtaining unit is an example of means for obtaining vehicle pairing request data as described herein.

The means can be configured to determine a correspondence between vehicle identification data and stored identification data. For example, the means can be configured to determine that vehicle identification data corresponds to previously stored identification data assigned to a service request. A data correspondence determination unit is one example of a means for determining a correspondence between vehicle identification data and stored identification data as described herein.

The means can be configured to determine a temporary pairing code. For example, the means can be configured to determine, based at least in part on the vehicle identification data, a temporary pairing code associated with the vehicle. A temporary pairing code determination unit is one example of a means for determining a temporary pairing code as described herein.

The means can be configured to provide a temporary pairing code. For example, the means can be configured to provide, to a vehicle provider, the temporary pairing code. A temporary pairing code providing unit is one example of a means for providing a temporary pairing code as described herein.

The means can be configured to obtain a pairing request. For example, the means can be configured to obtain a device pairing request via an application executed by a user device. The pairing request can include the temporary pairing code and an operational certificate that includes device identification data associated with the user device. A pairing request obtaining unit is one example of a means for obtaining a pairing request as described herein.

The means can be configured to pair the user device and the vehicle. For example, the means can be configured to pair the vehicle and the user device based on the device pairing request by storing pairing data indicative of an association between the user device and the vehicle. A pairing unit is one example of a means for pairing a user device and a vehicle as described herein.

The present disclosure provides a number of technical effects and benefits. As one example technical effect and benefit, the systems and methods of the present disclosure more optimally provide secure and authorized communication between multiple entities (e.g., a service entity, a user device, a vehicle operator, a vehicle provider, a vehicle, etc.). More particularly, the present disclosure can provide a secure authorization chain between user devices, vehicles, service entities, vehicle providers, and/or vehicle operators to secure passenger safety and security. By providing a secure chain of security between vehicle operators, vehicles, and/or service providers, the present disclosure can significantly increase safety of passengers and customers of vehicle service providers.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art. With reference to the figures, example embodiments of the present disclosure will be discussed in further detail.

With reference now to the FIGS., example aspects of the present disclosure will be discussed in further detail. FIG. 1 depicts a block diagram of an example system 100 for controlling and communicating with a vehicle according to example embodiments of the present disclosure. As illustrated, FIG. 1 shows a system 100 that can include a vehicle 105 and a vehicle computing system 110 associated with the vehicle 105. The vehicle computing system 110 can be located onboard the vehicle 105 (e.g., it can be included on and/or within the vehicle 105).

The vehicle 105 incorporating the vehicle computing system 110 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for pairing and/or authenticating a user device (e.g., user device 130), the autonomous vehicle, the user 125, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 155 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170A, using a perception system 170, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The vehicle motion planning can include an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectory(s). For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 130. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., its one or more processors, etc.) to perform operations and functions, such as those described herein matching users and vehicles/vehicle fleets, pairing and/or authenticating user(s) (e.g., user 125), vehicle(s) (e.g., vehicle 105), operators of vehicle(s), user device(s) (e.g., user device 130), etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

The operations computing system 190A can be configured to pair a user device and an autonomous vehicle based at least in part on a device pairing request. As an example, the operations computing system 109A of the service entity 185 (e.g., an entity that offers and/or coordinates vehicle service(s), etc.) can obtain a vehicle pairing request that identifies a vehicle (e.g. vehicle 105). The vehicle can be an autonomous vehicle (e.g. vehicle 105) utilized by and/or available to the service entity for providing vehicle services (e.g., transportation services, delivery services, courier services, etc.). The autonomous vehicle can be, for example, included in a fleet of a third party vehicle provider that offers its vehicles to the service entity. Based on the vehicle pairing request, the operations computing system 190A can determine that the vehicle (and/or a vehicle provider or vehicle operator associated therewith) corresponds to previously stored identification data (e.g., to ensure that the vehicle, vehicle provider, and/or the operator is known to the service entity, etc.). The operations computing system 190A can determine a temporary pairing code (e.g., a 6-number PIN code, etc.) for the vehicle and can provide the temporary pairing code to the vehicle provider. This can include sending the temporary pair code to a computing system of the vehicle provider (e.g., remote computing system(s) 190B) and/or a user device (e.g., user device 130) of a vehicle operator associated with the vehicle (e.g., user 125).

After providing the temporary pairing code, the operations computing system 190A can obtain a device pairing request via an application executed by the user device (e.g., user device 130, etc.). The device pairing request can include the temporary pairing code and an operational certificate that includes device identification data. As an example, the operational certificate can be or otherwise include a previously provided certificate that authorizes the user device 130 to communicate with the operations computing system 190A. The operations computing system 190A can pair the user device 130 and the vehicle 105 based on the device pairing request. More particularly, the operations computing system 190A can, in some implementations, store device pairing data that indicates an association between the user device 130 and the vehicle 105. In some implementations, the operations computing system 190A can also store data indicative of one or more associations between the application executed by the user device 130, the user device 130, the vehicle 105, a vehicle provider (e.g., vehicle provider associated with remote computing system(s) 190B), and/or a vehicle operator (e.g., user 125). In such fashion, the operations computing system 190A of the vehicle service provider can securely and efficiently generate an authorized pairing between multiple entities, therefore ensuring that all aspects of the vehicle service remain authorized and further optimizing the safety and security of the provided vehicle service.

Figure 2:
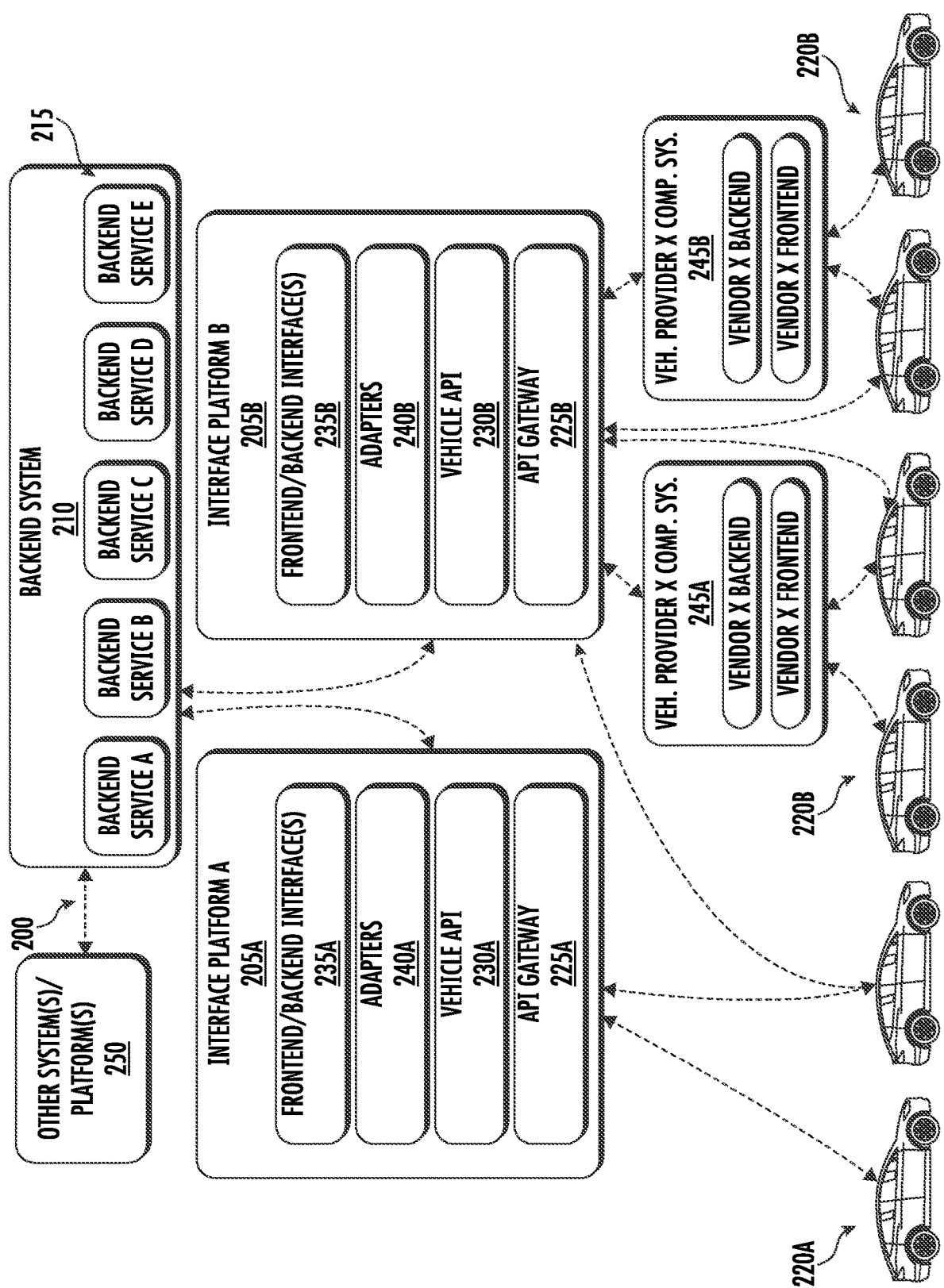
FIG. 2 depicts an example service infrastructure system according to example embodiments of the present disclosure.

FIG. 2 depicts an example service infrastructure system 200 according to example embodiments of the present disclosure. The service infrastructure 200 can include one or more systems, interfaces, and/or other components that can be included in an operations computing system of the service entity for coordinating vehicle services and managing/supporting the autonomous vehicle associated therewith. The service infrastructure 200 can represent, for example, the architecture of a service platform of the operations computing system for coordinating and providing one or more vehicle services (e.g., via autonomous vehicle(s), etc.).

The service infrastructure 200 of an operations computing system can include a first application programming interface platform 205A, a second application programming interface application platform 205B, and/or a backend system 210 with one or a plurality of backend services 215. These components can allow the service infrastructure 200 (e.g., the operations computing system) to communicate with one or more autonomous vehicles and/or one or more other systems.

The first application programming interface platform 205A can facilitate communication with one or more autonomous vehicles of the service entity. For example, as described herein, the service entity may own, lease, etc. a fleet of autonomous vehicles 220A that can be managed by the service entity (e.g., its backend services) to provide one or more vehicle services. The autonomous vehicle(s) 220A can be utilized by the service entity to provide the vehicle service(s) and can be included in the fleet of the service entity. Such autonomous vehicle(s) may be referred to as "service entity autonomous vehicles" or "first party autonomous vehicles."

The first application programming interface platform 205A can include a number of components to help facilitate the support, coordination, and management of the first party autonomous vehicles 220A associated with the service entity. The first application programming interface platform 205A (e.g., a private platform, etc.) can provide access to one or more backend services 215 that are available to the first party autonomous vehicles 220A. To help do so, the first application programming interface platform 205A can include a first API gateway 225A. The first API gateway 225A can function as a proxy for application programming interface (API) calls and can help to return an associated response. The first API gateway 225A can help provide other support functions for the service infrastructure 200 such as, for example, authentication functions, etc.

The interface platform 205A can facilitate pairing and/or authentication of multiple entities. As an example, the interface platform 205A can obtain a vehicle pairing request via API gateway 225A that identifies a vehicle 220A/220B (e.g., a first-party vehicle, a third-party vehicle associated with a vehicle provider (e.g., 245A/245B), etc.). The vehicle 220A/220B can be a first-party or a third-party autonomous vehicle utilized by and/or available to the service entity for providing vehicle services (e.g., transportation services, delivery services, courier services, etc.). For example, the vehicle 220A/220B (e.g., vehicle 220A) can be a first-party autonomous vehicle owned by or otherwise associated with the service entity. For another example, the vehicle 220A/220B (e.g., vehicle 220B) can be included in a fleet of a third party vehicle provider that offers its vehicles to the service entity (e.g., the vehicle provider of computing system 245A).

Based on the vehicle pairing request, the operations computing system can, via interface platform 205A, determine that the vehicle 220A/220B (and/or a vehicle provider or vehicle operator associated therewith) corresponds to previously stored identification data (e.g., via interface with backend system 210). The operations computing system 200 can, via interface platform A, determine a temporary pairing code (e.g., a 6-number PIN code, etc.) for the vehicle and can provide the temporary pairing code to the vehicle provider. For example, the interface platform A can be used to determine a temporary pairing code for vehicle 220A/220B and can send the temporary pairing code to computing system 245A of the vehicle provider and/or a user device of a vehicle operator associated with the vehicle 220A/220B.

After providing the temporary pairing code, the interface platform 205A can obtain a device pairing request via an application executed by the user device (e.g., a passenger-facing tablet included in the vehicle, etc.). The device pairing request can include the temporary pairing code and an operational certificate that includes device identification data (e.g., a previously provided certificate that authorizes the user device to communicate with the operations computing system, etc.). As an example, the temporary pairing code can be obtained from the operations computing system by a vehicle operator (e.g., via data transmitted to a device of the vehicle operator, etc.). The vehicle operator can enter the temporary pairing code into the application executed by the user device, and the temporary pairing code can be included in the device pairing request. As another example, the operations computing system can send the temporary pairing code to the application executed by the user device. In response, the user device can send a device pairing request to the operations computing system that includes the temporary pairing code. In such fashion, the temporary pairing code can be included in the device pairing request with or without the actions of a vehicle operator.

The operations computing system can, via interface platform 205A, pair the user device and the vehicle based on the device pairing request (e.g., using backend service(s) of the backend system 210. More particularly, the operations computing system can store device pairing data that indicates an association between the user device and the vehicle 220A (e.g., using the backend system 210 facilitated by interface platform 205A). In some implementations, the operations computing system can, via interface platform 205A, also store data indicative of an association with the user device, the vehicle (e.g., vehicle 220B), and a vehicle provider and/or operator (e.g., associated with computing system 245A). In such fashion, the operations computing system of the vehicle service provider can, via interface platform 205A, securely and efficiently generate an authorized pairing between multiple entities (e.g., the user device, the vehicle, the provider/operator, etc.).

The first application programming interface platform 205A can include one or more APIs such as, for example, a first vehicle API 230A. The first vehicle API 230A can include a library and/or parameters for facilitating communications between a vehicle (e.g., first party autonomous vehicle 220A) and the backend service(s) 215 of the backend system 210. For example, the first vehicle API 230A can be called by a first party autonomous vehicle 220A, a third party autonomous vehicle 220B and/or another system (e.g., system(s)/platform(s) 250) to help communicate data, messages, etc. to and/or from an autonomous vehicle and/or another system (e.g., system(s)/platform(s) 250). The first vehicle API 230A can provide for communicating such information in a secure, bidirectional manner that allows for expanded processing of data offboard a vehicle, analyzing such data in real time, and/or the like.

The first application programming interface platform 205A can include first frontend/backend interface(s) 235A. Each first frontend/backend interface 235A can be associated with a backend service 215 of the backend system 210. The first frontend/backend interface(s) 235A can serve as interface(s) for one client (e.g., an external client such as a first party autonomous vehicle 220A, third party autonomous vehicle 220B, etc.) to provide data to another client (e.g., a backend service 215). In this way, the frontend/backend interface(s) 235A can be external facing edge(s) of the first application programing interface platform 205A that are responsible for providing secure tunnel(s) for first party autonomous vehicles 220A, third-party autonomous vehicles 220B, and/or other system(s)/platform(s) 250 to communicate with the backend system 210 (and vice versa) so that a particular backend service can be accessed by a particular first party autonomous vehicle 220A, third party autonomous vehicle 220B, and/or other system(s)/platform(s) 250.

In some implementations, the first application programing interface platform 205A can include one or more first adapters 240A, for example, to provide compatibility between one or more first frontend/backend interfaces 235A and one or more of the API(s) associated with the first application programming interface platform 205A (e.g., vehicle API 230A). The first adapter(s) 240A can provide upstream and/or downstream separation between particular infrastructure components, provide or assist with data curation, flow normalization and/or consolidation, etc.

The second application programming interface platform 205B (e.g., a public platform, etc.) can facilitate communication with one or more autonomous vehicles of a third party vehicle provider. As described herein, a third party vehicle provider can be an entity that makes one or more of its autonomous vehicles available to the service entity for the provision of vehicle services. This can include, for example, an individual, an original equipment manufacturer (OEM), a third party vendor, or another entity that places its autonomous vehicle(s) online with the service platform of the service entity such that the autonomous vehicle(s) can provide vehicle services of the service entity. These autonomous vehicles may be referred to as "third party autonomous vehicles" and are shown in FIG. 2 as third party autonomous vehicles 220B. Even though such autonomous vehicles may not be included in the fleet of autonomous vehicles of the service entity, the service infrastructure 200 (e.g., of the service entity's service platform, etc.) can allow the third party autonomous vehicles 220B to provide vehicle services offered by the service entity, access the one or more backend services 215 of the backend system 210, etc.

The second application programming interface platform 205B can allow the service platform to communicate directly or indirectly with autonomous vehicle(s). In some implementations, a third party autonomous vehicle 220B may call an API of, send data/message(s) to, receive data/message(s) from/directly through, etc. the second application programming interface platform 205B.

Additionally, or alternatively, another computing system can serve as an intermediary between the third party autonomous vehicles 220B and the second application programming interface platform 205B (and the service platform associated therewith). For example, the service infrastructure 200 can be associated with and/or in communication with one or more third party vehicle provider computing systems 245A-B, such as a vehicle provider X computing system and a vehicle provider Y computing system. Each third party vehicle provider X, Y can have its own, separate third party autonomous fleet including respective third party autonomous vehicles 220B. The third party vehicle provider computing systems 245A-B can be distinct and remote from the service infrastructure 200 and can provide for management of vehicles associated with that particular third party vehicle provider. As shown in FIG. 2, a third party vehicle provider computing system 245A-B can include its own backends and/or frontends for communicating with other systems (e.g., third party autonomous vehicle(s) 220B, operations computing system, etc.).

The third party computing system 245A-B associated with a particular third party autonomous vehicle fleet can serve as the communication intermediary for that fleet. For example, third party autonomous vehicles 220B associated with third party vehicle provider X can communicate with the third party vehicle provider X computing system 245A which can then communicate with the service infrastructure 200 (e.g., to access the available backend services 215) via the second application programming interface platform 205B. Data from the service infrastructure 200 (e.g., the backend services 215) can be communicated to the vehicle provider X computing system 245A (e.g., via the second application programming interface platform 205B) and then to the third party autonomous vehicles 220B associated with third party vehicle provider X. In another example, third party autonomous vehicles 220B associated with third party vehicle provider Y can communicate with the third party vehicle provider Y computing system 245B which can then communicate with the service infrastructure 200 (e.g., to access the available backend services 215) via the second application programming interface platform 205B. Data from the service infrastructure 200 (e.g., the backend services 215) can be communicated to the third party vehicle provider Y computing system 245B (e.g., via the second application programming interface platform 205B) and then to the third party autonomous vehicles 220B associated with third party vehicle provider Y.

The second application programming interface platform 205B can include a number of components to help facilitate the support, coordination, and management of the third party autonomous vehicles 220B associated with the third party vehicle providers. The second application programming interface platform 205B can provide access to one or more backend services 215 that are available to the third party autonomous vehicles 220B. To help do so, the second application programming interface platform 205B can include a second API gateway 225B. The second API gateway 225B can function as a proxy for application programming interface (API) calls and can help to return an associated response. The second API gateway 225B can help provide other support functions for the service infrastructure 200 such as, for example, authentication functions, etc.

The second application programming interface platform 205B can include one or more APIs such as, for example, a second vehicle API 230B. The second vehicle API 230B can include a library and/or parameters for facilitating communications between the third party autonomous vehicles 220B and the backend service(s) 215 of the backend system 210. For example, the second vehicle API 230B can be called by a third party autonomous vehicle 220B and/or another system (e.g., a third party vehicle provider computing system 245, etc.) to help communicate data, messages, etc. to and/or from an autonomous vehicle. The second vehicle API 230B can provide for communicating such information in a secure, bidirectional manner.

The second application programming interface platform 205B can include second frontend/backend interface(s) 235B. Each of the second frontend/backend interface(s) 235B can be associated with a backend service 215 of the backend system 210. The second frontend/backend interface(s) 235B can serve as interface(s) for one client (e.g., an external client such as a third party autonomous vehicle 220B, a third party vehicle provider computing system 245A-B) to provide data to another client (e.g., a backend service 215). In this way, the second frontend/backend interface(s) 235B can be external facing edge(s) of the second application programing interface platform 205B that are responsible for providing secure tunnel(s) for third party autonomous vehicles 220B (and/or other intermediary systems) to communicate with the backend system 210 (and vice versa) so that a particular backend service 215 can be utilized. In some implementations, the second application programing interface platform 205B can include one or more second adapters 240B, for example, to provide compatibility between one or more second frontend/backend interfaces 235B and one or more of the API(s) associated with the second application programming interface platform 205B (e.g., vehicle API 230B).

In some implementations, the first party autonomous vehicles 220A can utilize the second application programming interface platform 205B to access/communicate with the service platform/backend service(s) 215. This can allow for greater accessibility and/or back-up communication options for the first party autonomous vehicles 220A. Similarly, in some implementations, the third party autonomous vehicles 220B can utilize the first application programming interface platform 205A to access/communicate with the service platform/backend service(s) 215 to allow for greater accessibility and/or back-up communication options for the third party autonomous vehicles 220B.

The backend system 210 can host, store, execute, etc. one or more backend services 215. The backend service(s) 215 can be implemented by system client(s), which can include hardware and/or software that is remote from the autonomous vehicles and that provide a particular service to an autonomous vehicle. The backend service(s) 215 can include a variety of services that help coordinate the provision of vehicle service(s) and support the autonomous vehicles and/or the third party vehicle providers performing/providing those vehicle service(s).

For example, the backend service(s) 215 can include a matching service that is configured to match an autonomous vehicle and/or an autonomous vehicle fleet with a service request for vehicle services. Based on a match, the matching service can generate and communicate data indicative of a candidate vehicle service assignment (indicative of the requested vehicle service) for one or more autonomous vehicles. In some implementations (e.g., for first party autonomous vehicle(s) 220A), the candidate vehicle service assignment can include a command that a first party autonomous vehicle 220A is required to accept, unless it would be unable to safely or fully perform the vehicle service. In some implementations (e.g., for third party autonomous vehicle(s) 220B), the candidate vehicle service assignment can include a request or offer for one or more autonomous vehicles to provide the vehicle service. The candidate vehicle service assignment can be communicated to one or more third party vehicle provider computing systems 245 and/or one or more autonomous vehicle(s) 220B (e.g., via the interface platform B 205B) and/or one or more autonomous vehicle(s) 220A (e.g., via the interface platform A 205A). The candidate vehicle service assignment can be accepted or rejected. If accepted, an autonomous vehicle 220A, 220B can be associated (e.g., assigned to service, etc.) with the vehicle service assignment. The vehicle service assignment can include data indicative of the user, a route, an origin location for the vehicle service, a destination location for the vehicle service, service parameters (e.g., time restraints, user accommodations/preferences, etc.), and/or any other information associated with a vehicle service.

The backend service(s) 215 can include an itinerary service. The itinerary service can be configured to maintain, update, track, etc. a data structure indicative of one or more task(s) and/or candidate task(s) associated with (and/or potentially associated with) a particular autonomous vehicle, autonomous vehicle fleet, and/or vehicle provider. The tasks can include, for example, vehicle service assignments for providing vehicle services and/or tasks associated with an activity other than the performance of a vehicle service. For example, the tasks can include: a testing task (e.g., for testing and validating autonomy software, hardware, etc.); a data acquisition task (e.g., acquiring sensor data associated with certain travel ways, etc.); a re-positioning task (e.g., for moving an idle vehicle between vehicle service assignments, to high demand areas, etc.); a circling task (e.g., for travelling within the current geographic area in which a vehicle is located (e.g., circle the block or neighborhood), etc.); a maintenance task (e.g., for instructing travel to a service depot to receive maintenance, etc.); a re-fueling task; a vehicle assistance task (e.g., where a vehicle travels to assist another vehicle, etc.); a deactivation task (e.g. going offline such that a vehicle, fleet of vehicles, or vehicle providers no longer accept service request, etc.); a parking task; and/or other types of tasks. The itinerary service can maintain an itinerary for an autonomous vehicle, fleet, vehicle provider, etc. The itinerary can serve as a queue for the various tasks. In some implementations, the tasks can be associated with a priority or order for which they are deployed to an autonomous vehicle, fleet, vehicle provider, etc.

In some implementations, the vehicle service assignment can be associated with a multi-modal vehicle service. For example, the user may request and/or be provided a multi-modal user itinerary by which the user is to travel to the user's ultimate destination via two or more types of transportation modalities (e.g., ground based vehicle, aerial vehicle, public transit, etc.). As such, the origin location and/or destination location identified in the vehicle service assignment may include intermediate locations (e.g., transfer points, etc.) along the user's multi-modal itinerary.

The backend service(s) 215 can include a deployment service that communicates tasks for an autonomous vehicle to complete. For example, the deployment service can communicate data indicative of a vehicle service assignment and/or another task to an autonomous vehicle (or an intermediary system). The deployment service can communicate such data to an autonomous vehicle (or an intermediary system) based at least in part on the itinerary associated therewith. By way of example, the highest priority task and/or the task that is next in order can be deployed.

The backend services 215 can include a routing service. The routing service can be configured to provide an autonomous vehicle with a route for a vehicle service and/or another task. The route can be based at least in part on factors associated with the geographic area in which the autonomous vehicle is (or will be) travelling (e.g., roadways, weather, traffic, events, etc.). Additionally, or alternatively, the route can be based at least in part the autonomy capabilities of the autonomous vehicle (e.g., ability to complete an unprotected left-hand turn, U-turn, etc.). In some implementations, the routing service can be configured to assign, coordinate, monitor, adjust, etc. one or more designated pick-up and/or drop-off zones for the vehicle service(s). The routing service can be available to first party autonomous vehicles 220A. In addition, or alternatively, the routing service can be available to third party autonomous vehicles 220B if permitted/requested by an associated third party vehicle provider.

The backend services 215 can include a rider experience service. The rider experience service can be configured to communicate data to a rider associated with the vehicle service. This can include, for example, upcoming vehicle actions, routes, drop-off zones, user adjustable vehicle conditions (e.g., music, temperature, etc.). Such information can be presented via a display device of an onboard tablet associated with an autonomous vehicle, a user device associated with the rider, etc. through a software application associated with the service entity.

The backend services 215 can include a remote assistance service. The remote assistance service can be configured to provide remote assistance to an autonomous vehicle and/or a user (e.g., a rider associated with the vehicle service, etc.). For example, a remote assistance operator can take over control of one or more vehicle operations and/or otherwise assist an autonomous vehicle during the one or more vehicle operations. By way of example, a remote assistance operator can remotely control the navigation of an autonomous vehicle to navigate the vehicle around/past an unexpected obstruction in a travel way (e.g., a fallen tree, etc.). In another example, the remote assistance operator can communicate with a user (e.g., via the onboard tablet, user's phone, etc.) in the event that the user is in need of help.

The backend services 215 can include a simulation/testing service. The simulation/testing service can help facilitate vehicle provider integration with the service platform. For example, simulation/testing service can provide testing environments for vehicle providers to simulate communications and/or the performance of vehicle services using the service infrastructure 200.

The backend services 215 can include device pairing services. For example, the backend services 215 can include one or more memories (e.g., a cloud server, etc.) that stores data indicative of a pairing between multiple entities (e.g., a vehicle 220A/220B and a user device associated with vehicle 220A/220B).

The backend services 215 can include temporary pairing code generation services. As an example, the backend services 215 can include a temporary pairing code generation service that generates a unique pairing code associated with a vehicle identified by a vehicle pairing request. The temporary pairing code can be generated by the backend service 215 in any format (e.g., a 4-digit numeric code, a 6-digit alphanumeric code, an encoding, etc.). As an example, the temporary pairing code may be a machine-readable visual encoding (e.g., a QR code, a proprietary QR-like visual encoding, etc.). As another example, the temporary pairing code can be a spoken utterance (e.g., a phrase or series of words that can be spoken by the vehicle operator to an associated computing device, etc.). As yet another example, the temporary pairing code can be or otherwise include instruction(s) to the vehicle provider (e.g., a vehicle operator associated therewith) to provide biometric authorization data (e.g., facial recognition data, speech recognition data, fingerprint recognition data, etc.). It should be noted that the temporary pairing code can be generated by the computing system using any type of cryptographic function (e.g., a cryptographic hash function, etc.). Any such information can be stored in a secure manner to avoid unauthorized or unwanted access. Furthermore, an associated user can be provided an ability to opt-out of providing such information, thereby allowing the user to control when and if associated data will be collected and stored.

The backend services 215 can include an authentication certificate generation service. As an example, the service can generate device authorization certificate (e.g., an authentication token, a tokenized authentication certificate, etc.) for a user device. The device authorization certificate can be a certificate that authorizes the user device to communicate with the operations computing system and/or one or more services of the operations computing system (e.g., other backend services 215, etc.). For example, the backend services 215 can generate the device authorization certificate to be a permanent authorization certificate provided to the user device when registering the user device with the service entity and/or the vehicle provider (e.g., a "birth" authorization certificate, etc.).

The backend services 215 can include a backend authentication certificate generation service. As an example, the service can determine that a combination of a vehicle and a user device accurately corresponds to previously stored and authorized pairing data. Based on the secure and authorized correspondence between the obtained data and the stored association, the service can generate a backend authentication certificate for the user device. The backend authentication certificate can be configured to provide access to one or more of the backend services 215. As an example, the backend authentication certificate can be configured to provide access to API gateway 225A and/or API gateway 225B.

The backend services 215 can include a service status request service. The service status request service can be configured to generate and provide service status request data. As an example, the service status request can be a request for a status of a service currently being provided by a vehicle and/or a service scheduled to be provided by the vehicle. The service provided by the vehicle can be any service offered by the service entity associated with the operations computing system that can be provided by a vehicle provider (e.g., a delivery service, a transportation service, a pooled vehicle service, etc.). As an example, the service status request may request the status of a transportation service that is currently being provided by the vehicle. As another example, the service status request may request a pooled vehicle service, which can be utilized to concurrently fulfill a plurality of different vehicle service requests (e.g., a plurality of transportation services, a plurality of delivery services, a mixed plurality of both transportation and delivery services, etc.).

The backend services 215 can include a service adjustment service. As an example, the operations computing system can obtain a service adjustment request from a user device (e.g., via API gateway 225A). The service adjustment request can be indicative of a service adjustment selected by a user (e.g., using one or more user interface elements provided by a service entity application executed on the user device, etc.). Based on the service adjustment data, the service adjustment service can generate and provide service adjustment data to the user device and/or the vehicle associated with the user device. More particularly, the service adjustment data can be configured by the service adjustment service to adjust one or more aspects of the service provided by the vehicle in accordance with the service adjustments selected by the user (e.g., as indicated by the service adjustment request, etc.). The service adjustment data can include any adjustment that can be selected by a user for the service being provided (e.g., a service stop request, a destination modification request, a service support request, a service safety request, etc.). As an example, the service adjustment data may include an adjustment from a first destination to a second destination. As another example, the service adjustment data may include an adjustment that stops the vehicle along its current route.

The backend services 215 can include one or more other services. This can include, for example, payment services, vehicle rating services, health and maintenance services, software update/deployment services, and/or other services.

In some implementations, one or more backend services 215 that are available to the first party autonomous vehicles 220A (e.g., via the first application programming interface platform 205A) may not be available to the third party autonomous vehicles 220B (e.g., via the second application programming interface platform 205B), and vice versa. For example, a software update/deployment service for the first party autonomous vehicles 220A may not be accessible or suitable for a third party autonomous vehicle 220B that utilizes the onboard autonomy software of a third party vehicle provider (not the service entity). As such, a software update/deployment backend service may not be able to communicate with a third party autonomous vehicle 220B and/or vice versa.

In some implementations, the service infrastructure 200 can include a test platform for validating and vetting end-to-end platform functionality, without use of a real vehicle on the ground. For example, the test platform can simulate trips with human drivers and/or support fully simulated trip assignment and/or trip workflow capabilities. For example, the test platform can simulate and monitor data traffic through the service infrastructure 200 to ensure proper functioning. In some implementations, the testing platform can access the simulation/testing backend to help facilitate a test or simulation.

In some implementations, the service infrastructure 200 can utilize a plurality of software development kits (SDKs) that help provide access to the first and second application programming interface platforms 205A, 205B. All (or a portion of) external communication with the platforms can be done via the SDKs. For example, the SDKs can include a first SDK (e.g., private SDK) and a second SDK (e.g., public SDK) and specific endpoints to facilitate communication with the first and second application programming interface platforms 205A, 205B, respectively. In some implementations, the first party autonomous vehicle(s) 220A (and/or a test platform) can use both the first and second SDKs, whereas the third party autonomous vehicles 220B and/or the third party vehicle provider computing systems 245 can use only the second SDK and associated endpoints. In some implementations, the SDKs can provide a single entry point, which can improve consistency across both the service provider fleet and the third party entity fleet(s). As an example, a second SDK can provide secured access to the second application interface platform 205B and access to capabilities such as vehicle service assignments, routing, and/or the like. The first SDK can be accessed by the first party autonomous vehicles 205A and provide access to capabilities including those available only to the first party autonomous vehicles 205A.

In some implementations, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK to which to provide access. In some implementations, SDKs can be implemented onboard a first or third party autonomous vehicle 220A, 220B and/or a third party vehicle provider computing system 245A-B.

In some implementations, the service infrastructure 200 can facilitate communication between the service platform and one or more other system(s)/platform(s) 250 associated with the service entity/operations computing system. By way of example, the service entity may have (e.g., the operations computing system may include, etc.) one or more other system(s)/platform(s) 250 that can help indicate what services/vehicles are available to a user or other system, coordinate the provision of vehicle services by human-driven vehicles, and/or are specifically associated with certain types of services (e.g., delivery services, aerial transport services, etc.). The other system(s)/platform(s) 250 may communicate with the service platform utilizing the service infrastructure 200 (e.g., interface platform 205A, etc.) to determine, for example, whether any autonomous vehicles would be available to the user for any potential vehicle services.

Figure 3:
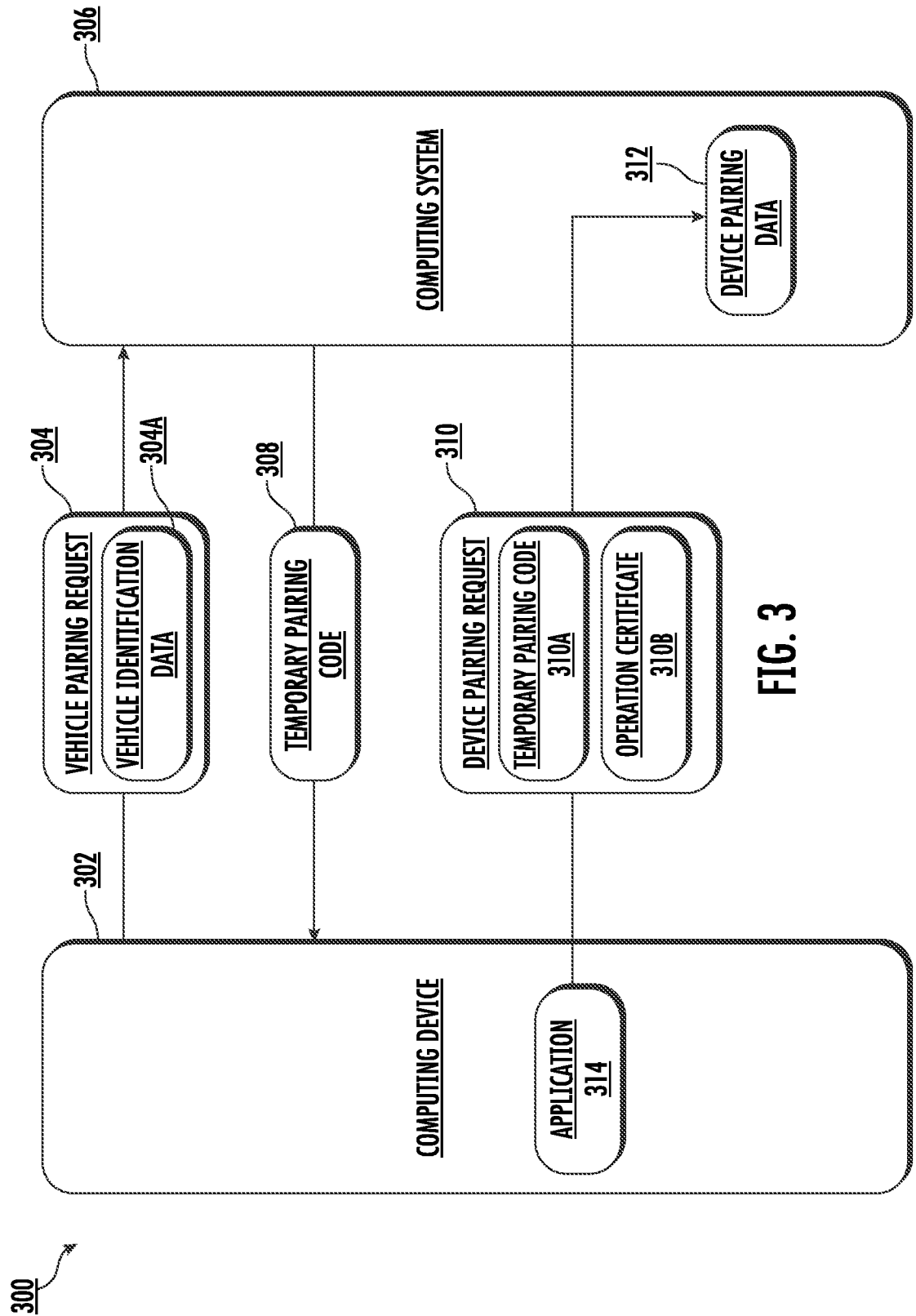
FIG. 3 depicts an example data flow diagram for storage of an association between multiple service entities according to example embodiments of the present disclosure.

FIG. 3 depicts an example data flow diagram 300 for storage of an association between multiple service entities according to example embodiments of the present disclosure. More particularly, an operations computing system (e.g., computing system 306) can obtain a vehicle pairing request 304 from a computing device 302. As an example, the computing system 306 may be an operations computing system associated with a service entity (e.g., a facilitator of vehicle service(s), etc.), and can obtain the vehicle pairing request 304 from a computing device 302 (e.g., a computing system) of a vehicle provider (e.g., a provider of vehicles to fulfill vehicle services facilitated by the service entity). This can include, for example, a third party vehicle provider associated with the autonomous vehicle to be paired. As yet another example, the computing system 306 may obtain a vehicle pairing request 304 from another computing device 302, computing system, and/or service (e.g., a backend service of the computing system, a vehicle pairing service, a driver authorization service, etc.) associated with the service entity (e.g., external or internal to the computing system, etc.). For example, the computing system 306 (e.g., the operations computing system) can obtain the vehicle pairing request 304 from a backend computing device 302 of the computing system 306. The computing systems shown in FIG. 3 can correspond, represent, include, be, etc. one or more computing systems described with reference to one or more other computing systems described herein. For example, computing system 306 correspond, represent, include, be, etc. operations computing system 190A and/or implement infrastructure 200.

The vehicle pairing request 304 can include vehicle identification data 304A. The vehicle identification data 304A can be configured to identify a specific identity of a vehicle (e.g., a vehicle type, a manufacturer brand and/or model, a color, a year of manufacture, one or more features of the vehicle, etc.). As an example, the vehicle identification data 304A can be or otherwise include a unique identification hash generated using a cryptographic hashing scheme based at least in part on specific identification features of the vehicle (e.g., manufacturer assigned VIN's, vehicle features, a vehicle color, etc.). It should be noted that the vehicle identification data 304A can, as an example, identify the vehicle as a vehicle known to be associated with the service entity associated with computing system 306 and/or a third party vehicle provider associated with computing device 302. As an example, the vehicle identification data 304A may correspond to identification data previously stored by the service entity (e.g., in one or more memories of computing system 306) that indicates the vehicle is owned by, controlled by, leased by, within the fleet of, and/or otherwise associated with the service entity. As another example, the vehicle identification data 304A may correspond to identification data previously stored by the service entity that indicates the vehicle is owned by, controlled by, leased by, within the fleet of, and/or otherwise associated with a trusted vehicle provider associated with computing device 302.

Based at least in part on the vehicle identification data 304A, the computing system 306 can generate a temporary pairing code 308 associated with the vehicle. More particularly, the temporary pairing code 308 can be associated with the vehicle or both the vehicle and the vehicle provider (e.g., associated with computing device 302, etc.). The temporary pairing code 308 can be generated in any format (e.g., a 4-digit numeric code, a 6-digit alphanumeric code, an encoding, etc.). As an example, the temporary pairing code 308 may be a machine-readable visual encoding (e.g., a QR code, a proprietary QR-like visual encoding, etc.). As another example, the temporary pairing code 308 can be a spoken utterance (e.g., a phrase or series of words that can be spoken by a vehicle operator to the computing device 302, etc.). As yet another example, the temporary pairing code 308 can be or otherwise include instruction(s) to the vehicle provider (e.g., a vehicle operator associated therewith) to provide biometric authorization data (e.g., facial recognition data, speech recognition data, fingerprint recognition data, etc.). It should be noted that the temporary pairing code 308 can be generated by the computing system 306 using any type of cryptographic function (e.g., a cryptographic hash function, etc.).

The computing system 306 can provide the temporary pairing code 308 to the computing device 302. More particularly, the temporary pairing code 308 can be provided to the computing device 302 of the vehicle provider and/or to a computing device 302 of a vehicle operator associated with the vehicle provider (e.g., a smartphone device 302 of the vehicle operator, etc.). As an example, the computing system 306 may provide the temporary pairing code 308 to a smartphone device (e.g., computing device 302) of a vehicle operator associated with the vehicle provider (e.g., to manually enter the pairing code in the computing device 302 that is remote or local to the vehicle, etc.). As another example, the computing system 306 may provide the temporary pairing code 308 to a computing device 302 of a computing service of the vehicle provider (e.g., a computing device, computing system, a backend service of a computing system, a vehicle pairing service, a driver authorization service, etc.).

The computing system 306 can obtain a device pairing request 310 via an application 314 executed by the computing device 302 (e.g., a user device, a passenger-facing computing device inside the cabin of a vehicle, etc.). The device pairing request 310 can be communicated directly or indirectly (e.g., via an intermediary) to the computing system 306. The device pairing request 310 can include the temporary pairing code 310A and an operational certificate 310B (e.g., a previously provided certificate that authorizes the computing device 302 to communicate with the computing system 306, etc.). As an example, the temporary pairing code can be obtained by the application 314 (e.g., received at an API of the application, entered in an application environment by a vehicle operator, etc.), and then included in the device pairing request 314. The operational certificate 310B can include device identification data that identifies the computing device 302. As an example, the device identification data may be or otherwise include a unique cryptographic identifier for the computing device 302. As another example, the device identification data may be or otherwise include a combination or hash of one or more conventional identifiers of the computing device 302 (e.g., one or more of a device ID, a hardware ID, an I.P. address, a MAC address, etc.).

As discussed previously, it should be noted that the computing device 302 can be any type of computing device, and can be utilized in any manner as related to the provided service. As an example, the computing device 302 can be a mobile device (e.g., a tablet, a smartphone, a smart display, etc.). For example, the computing device 302 can be a tablet located in the interior of the vehicle so that the computing device 302 is accessible to one or more passengers of the vehicle (e.g., to facilitate selection of user interface elements on a display of the computing device 302, etc.). As another example, the computing device 302 can be a computing device 302 incorporated in the vehicle computing system of the vehicle. For example, the computing device 302 can be a computing device (e.g., a discrete portion of computational resources of the vehicle computing device, etc.) that is communicatively connected to display device(s) located in the interior of the vehicle and/or on the exterior of the vehicle. For example, the computing device 302 may be or otherwise be included in the vehicle computing system of an autonomous vehicle, and may be communicatively coupled to a display device on the exterior of the vehicle (e.g., to facilitate selection of user interface elements by persons associated with delivery of an item such as a food order, etc.).

Based at least in part on the device pairing request 310, the computing system 306 can pair the vehicle (e.g., the vehicle identified by vehicle identification data 304A) with the computing device 302. For instance, the computing system 306 can store device pairing data 312 indicative of an association between the computing device 302 and the vehicle. Additionally, or alternatively, the computing system 306 can store device pairing data 312 indicative of one or more associations between any of the computing device 302, the application 314 executed by the computing device 302, the vehicle, and the vehicle operator.

More particularly, the computing system 306 can store device pairing data 312 that indicates a secure and authorized pairing between the multiple entities (e.g., application executed by the computing device 302, the computing device 302, the vehicle, the vehicle provider, the vehicle operator, etc.). As an example, the device pairing request 310 can include a unique application identifier associated with the application 314 (e.g., a uniquely assigned application ID, a hash based on aspect(s) of the application and the user device, etc.). The device pairing data can include pairing data indicative of an association between the unique application identifier and identification data of another entity (e.g., the device identification data included in operational certificate 310B, the vehicle identification data 304A, etc.). The computing system 306 can store the device pairing data 312 in an associated memory (e.g., database, internal storage device, third-party or first-party cloud storage service, etc.). In some implementations, the device storage data 312 can be temporally limited (e.g., can be valid for a specified amount of time, etc.).

Figure 4:
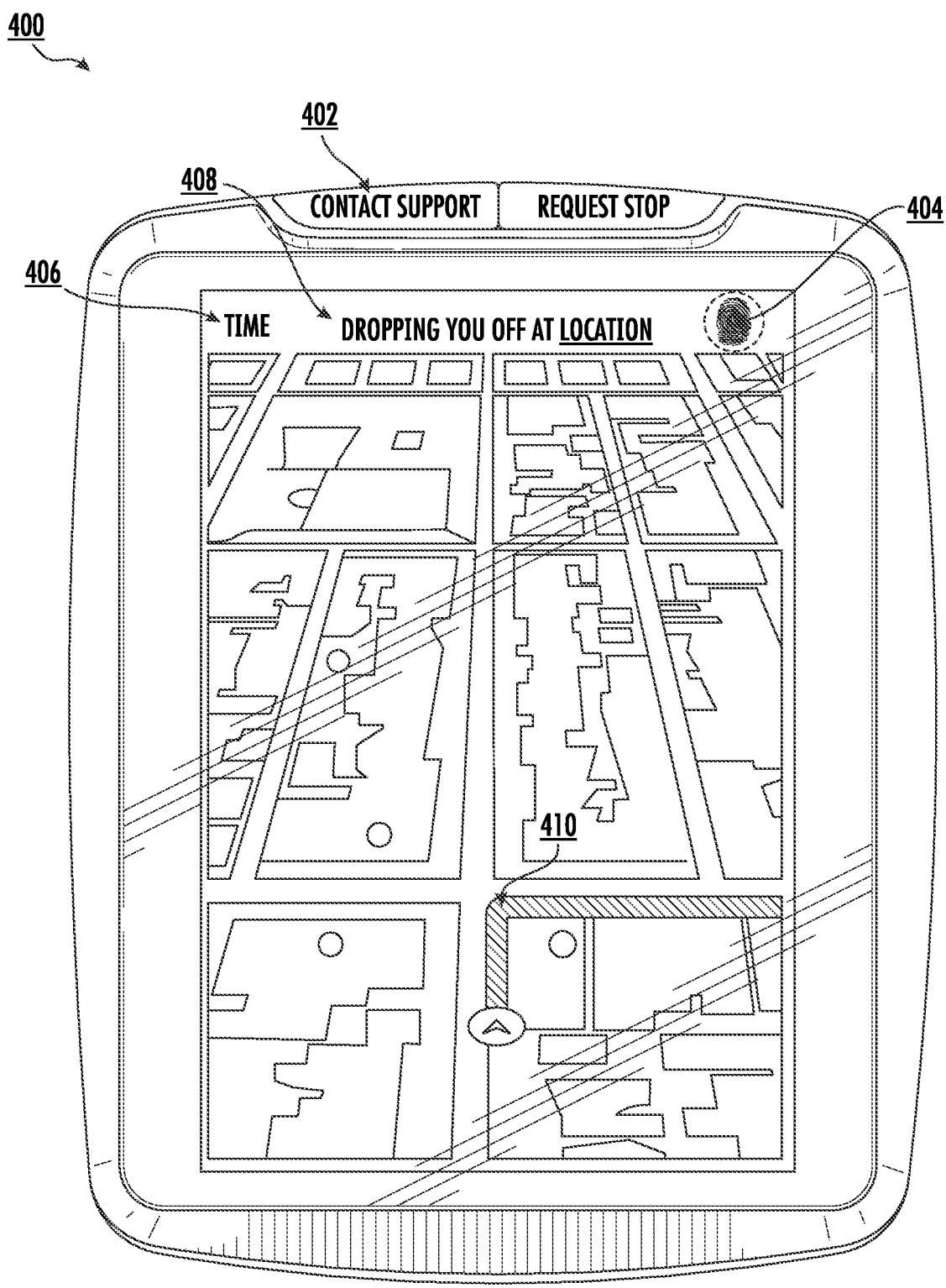
FIG. 4 depicts an example user interface for selectable service adjustment user input elements according to example embodiments of the present disclosure.

FIG. 4 depicts an example user interface 400 for selectable service adjustment user input elements (e.g., 402, 404, etc.) according to example embodiments of the present disclosure. The user interface can be displayed on a display device of a computing device 401 (e.g., a user computing device such as a tablet or smartphone, a vehicle computing device of an autonomous vehicle, etc.). The user interface 400 can be executed in an application executed by the computing device 401. As an example, the computing device 401 can be a computing device associated with a service entity (e.g., a facilitator of vehicle services, etc.) and the application executed by the computing device 401 can be an application associated with the service entity (e.g., an application associated with services from the service entity, etc.).

As an example, computing device 401 can execute an application that initiates the display of the user interface 400 to describe service status data from an operations computing system associated with the service entity. The service status data can describe any previous, current, and/or planned aspect of the service, and can be indicated to the user via one or more user interface elements. As an example, the service status data can include data regarding the current location of an autonomous vehicle and a planned route for the autonomous vehicle for a transportation service. This information can be represented as depicted by user interface element 410, which depicts the current location of the autonomous vehicle and a planned future portion of the route of the autonomous vehicle. As another example, the service status data can include a current time, which can be indicated to the user as depicted by user interface element 406. As yet another example, the service status data can include a planned destination for a transportation service, and can be indicated to the user as depicted by user interface element 408.

The computing device 401 can include user input element(s) (e.g., 402 and 404) that can be used to provide a service adjustment request to an operations computing system. These user input element(s) can be physical input element(s) (e.g., buttons) located on the computing device 401 (e.g., user input element 402, etc.) and/or can be touch input elements displayed on the display device (e.g., a touchscreen) of the computing device 401 (e.g., user input element 404, etc.). The service adjustment request can be indicative of a service adjustment selected by a user (e.g., using the user input elements(s), etc.). Based on the service adjustment data, the operations computing system can provide service adjustment data to the computing device 401 using the backend service of the computing system. More particularly, the service adjustment data can be configured to adjust one or more aspects of the service provided by the vehicle in accordance with the service adjustments selected by the user (e.g., as indicated by the service adjustment request, etc.). As an example, the user can interact with a "contact support" user input element (e.g., user input element 402, etc.). A service adjustment request can be generated that is configured to initiate contact with a support entity associated with the service entity and/or the vehicle provider (e.g., a remote service agent, an automated service agent, etc.). The service adjustment request can be provided to the operations computing system, and in response, the user can be contacted by a support entity. As another example, the user can interact with a "request stop" user input element (e.g., user input element 404, etc.). A service adjustment request can be generated including the stop request and can be provided to the operations computing system. In response, the operations computing system can provide service adjustment data configured to instruct the autonomous vehicle to stop the vehicle at the nearest safe stopping location. In such fashion, the user input elements 402/404 of the computing device 401 and/or the application executed by the device can be utilized to request any sort of adjustment to the vehicle service provided (e.g., stopping the vehicle, selecting a new destination, etc.), and the operations computing system can provide service adjustment data corresponding to the request.

Figure 5A:
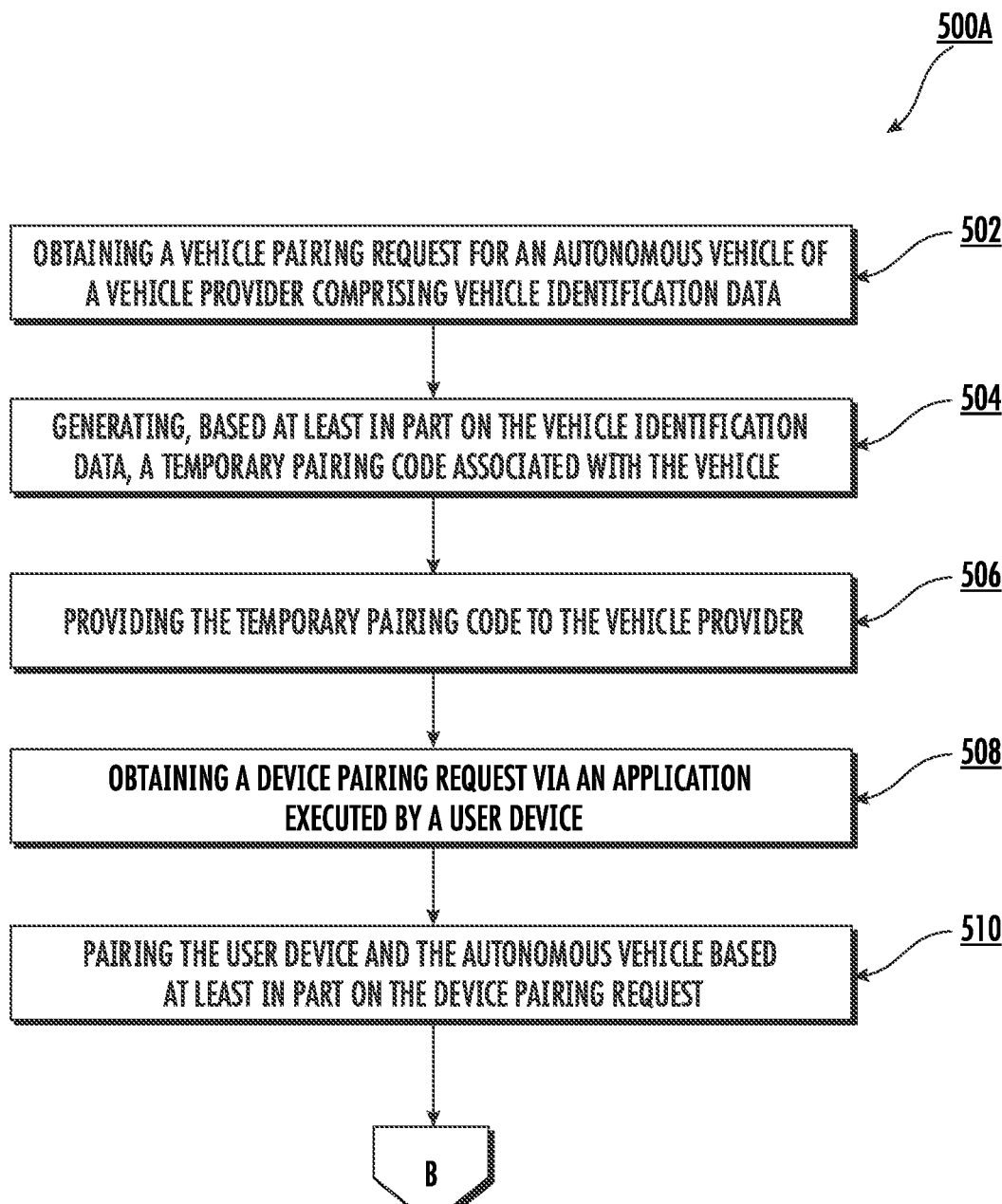
FIG. 5A depicts a flowchart diagram for an example method for pairing multiple entities according to example embodiments of the present disclosure.

FIG. 5A depicts a flowchart diagram of an example method 500A for pairing multiple entities according to example embodiments of the present disclosure. One or more portion(s) of the method 500A can be implemented by one or more computing devices such as, for example, the computing devices/systems described in FIGS. 1-4. Moreover, one or more portion(s) of the method 500A can be implemented as an algorithm on the hardware components of the device(s) described herein (e.g., as in FIGS. 1-4, 6, and 7) to, for example, pair multiple entities. FIG. 5A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500A can include obtaining a vehicle pairing request for an autonomous vehicle of a vehicle provider comprising vehicle identification data. For instance, an operations computing system (e.g., operations computing system 190A) can obtain a vehicle pairing request for a vehicle (e.g., an autonomous vehicle, etc.). The vehicle pairing request can be obtained from a variety of sources. As an example, the operations computing system may obtain a vehicle pairing request from a computing system of a vehicle provider. This can include, for example, a third party vehicle provider associated with the autonomous vehicle to be paired. As yet another example, the operations computing system may obtain a vehicle pairing request from another computing device, computing system, and/or service (e.g., a backend service of the computing system, a vehicle pairing service, a driver authorization service, etc.) associated with the service entity (e.g., external or internal to the computing system, etc.). For example, the computing system (e.g., the operations computing system) can obtain a vehicle pairing request from a backend service of the computing system.

The vehicle pairing request can include vehicle identification data. The vehicle identification data can be configured to identify a specific identity of the vehicle (e.g., a vehicle type, a manufacturer brand and/or model, a color, a year of manufacture, one or more features of the vehicle, etc.). As an example, the vehicle identification data can be or otherwise include a unique identification hash generated using a cryptographic hashing scheme based at least in part on specific identification features of the vehicle (e.g., manufacturer assigned VIN's, vehicle features, a vehicle color, etc.). It should be noted that the vehicle identification data can, in some implementations, identify the vehicle as a vehicle known to be associated with the service entity and/or a third party vehicle provider. As an example, the vehicle identification data may correspond to identification data previously stored by the service entity that indicates the vehicle is associated with the service entity. As another example, the vehicle identification data may correspond to identification data previously stored by the service entity that indicates the vehicle associated with a trusted vehicle provider. As such, the vehicle be utilized to facilitate provision of vehicle service(s) for the service entity while also being provided by a vehicle provider.

In some implementations, the vehicle identification data can be or otherwise include a unique identifier from a manufacturer of the vehicle and/or a provider of the vehicle (e.g., a manufacturer assigned VIN, a unique identifier assigned by a vehicle provider, etc.). As such, the vehicle identification data can be or otherwise include data that specifies the exact identity of the vehicle to the operations computing system of the service entity, while also conveying information regarding the vehicle (e.g., a seating capacity, vehicle features, vehicle range, etc.).

In some implementations, the vehicle pairing request can be associated with a vehicle provider. For instance, the vehicle pairing request can include vehicle operator identification data. The vehicle provider identification data may be or otherwise include valid vehicle operation credentials. As an example, the vehicle provider identification data may be or otherwise include a driver's license number that permits a vehicle operator (e.g., associated with the vehicle provider, etc.) to legally operate the vehicle. As another example, the vehicle provider identification data may be or otherwise include a pilot's license registration number that permits the vehicle operator to legally pilot an aircraft (e.g., a helicopter, VTOL craft, etc.). In some implementations, the vehicle provider identification data can include operation credentials that have previously been provided to the vehicle provider (e.g., from the service entity). This can include, for example, username, password(s), identifier(s) (e.g., series of character, etc.), and/or other information for helping to determine that the vehicle provider is authorized.

At (504), the method 500A can include generating, based at least in part on the vehicle identification data, a temporary pairing code associated with the vehicle. For instance, an operations computing system (e.g., operations computing system 190A) can, based at least in part on the vehicle identification data generate a temporary pairing code associated with the vehicle. More particularly, the temporary pairing code can be associated with the vehicle or both the vehicle and the vehicle provider. The temporary pairing code can be generated in any format (e.g., a 4-digit numeric code, a 6-digit alphanumeric code, an encoding, etc.). As an example, the temporary pairing code may be a machine-readable visual encoding (e.g., a QR code, a proprietary QR-like visual encoding, etc.). As another example, the temporary pairing code can be a spoken utterance (e.g., a phrase or series of words that can be spoken by the vehicle operator to an associated computing device, etc.). As yet another example, the temporary pairing code can be or otherwise include instruction(s) to the vehicle provider (e.g., a vehicle operator associated therewith) to provide biometric authorization data (e.g., facial recognition data, speech recognition data, fingerprint recognition data, etc.). It should be noted that the temporary pairing code can be generated by the computing system using any type of cryptographic function (e.g., a cryptographic hash function, etc.).

As described, the temporary pairing code generated by the operations computing system may only be valid for a specified amount of time. As an example, the temporary pairing code may be valid for 20 minutes. As another example, the temporary pairing code may be valid for 5 minutes. Additionally, or alternatively, in some implementations, the temporary pairing code can lose validity based on a number of incorrect codes received by the computing system. As an example, if the operations computing system receives four sequentially incorrect temporary pairing codes from a vehicle provider (e.g., and/or a vehicle operator associated therewith), the generated temporary pairing code can be invalidated.

At (506), the method 500A can include providing the temporary pairing code to the vehicle provider. For instance, an operations computing system (e.g., operations computing system 190A) can provide the temporary pairing code to the vehicle provider. More particularly, the temporary pairing code can be provided to a computing system of the vehicle provider and/or to a computing device of a vehicle operator associated with the vehicle provider (e.g., a smartphone device of the vehicle operator, etc.). As an example, the operations computing system may provide the temporary pairing code to a smartphone device of a vehicle operator associated with the vehicle provider (e.g., to manually enter the pairing code in a user device that is remote or local to the vehicle, etc.). As another example, the operations computing system may provide the temporary pairing code to a computing service of the vehicle provider (e.g., a computing device, computing system, a backend service of a computing system, a vehicle pairing service, a driver authorization service, etc.).

At (508), the method 500A can include obtaining a device pairing request via an application executed by a user device. For instance, an operations computing system (e.g., operations computing system 190A) can obtain a device pairing request via a user device (e.g., a passenger-facing computing device inside the cabin of the vehicle, etc.). More particularly, an application executed by the user device (e.g., an application associated with the service entity, etc.) can facilitate provision of the device pairing request to the operations computing system by obtaining the temporary pairing code and including the temporary pairing code in the device pairing request. For example, a vehicle operator can obtain the temporary pairing code from the operations computing system (e.g., via a personal computing device associated with the operator, etc.), and can enter the temporary pairing code into an application environment of the application. For another example, the operations computing system can provide the temporary pairing code directly to the application (e.g., across network(s) via one or more application programming interface(s) of the application, etc.). The application can include the temporary pairing code in the device pairing request alongside an operational certificate.

In some implementations, the application can include a unique application identifier. As an example, the operations computing system associated with the service entity may assign unique identification data to the application (e.g., a unique serial number, a cryptographic hash based on aspect(s) of the application instance and/or the user device, etc.) and save the unique identification data so that the unique application identifier can be associated with the application executed by the user device. In such fashion, each application (e.g., active application instance, user device installation, etc.) can be uniquely identified and paired to one or more additional entities at the operations computing system (e.g., the user device, the vehicle, the vehicle operator, etc.).

The device pairing request can be communicated directly or indirectly (e.g., via an intermediary) to the operations computing system (e.g., through application programming interface(s) of the operations computing system via the application executed by the user device, etc.). The device pairing request can include the temporary pairing code and an operational certificate (e.g., a previously provided certificate that authorizes the user device to communicate with the operations computing system, etc.). The operational certificate can include device identification data that identifies the user device. As an example, the device identification data may be or otherwise include a unique cryptographic identifier for the user device. As another example, the device identification data may be or otherwise include a combination or hash of one or more conventional identifiers of the user device (e.g., one or more of a device ID, a hardware ID, an I.P. address, a MAC address, etc.). It should be noted that the user device can be any type of computing device, and can be utilized in any manner as related to the provided service. As an example, the user device can be a mobile device (e.g., a tablet, a smartphone, a smart display, etc.). For example, the user device can be a tablet located in the interior of the vehicle so that the user device is accessible to one or more passengers of the vehicle (e.g., to facilitate selection of user input elements on a display of the user device, etc.). As another example, the user device can be a computing device incorporated in the vehicle computing system of the vehicle.

For example, the user device can be a computing device (e.g., a discrete portion of computational resources of the vehicle computing device, etc.) that is communicatively connected to display device(s) located in the interior of the vehicle and/or on the exterior of the vehicle. For example, the user device may be or otherwise be included in the vehicle computing system of an autonomous vehicle, and may be communicatively coupled to a display device on the exterior of the vehicle (e.g., to facilitate selection of user input elements of a user interface by persons associated with delivery of an item such as a food order, etc.).

In some implementations, prior to obtaining the device pairing request, the operations computing system can obtain a device authorization certificate from the user device. The device authorization certificate can be a certificate previously provided to the user device that authorizes the user device to communicate with the operations computing system and/or one or more services of the operations computing system (e.g., a licensing service, an edge gateway service, a backend service, etc.). In some implementations, the device authorization certificate can be provided by the operations computing system to the user device prior to generating the temporary pairing code associated with the vehicle. As an example, the device authorization certificate can be a permanent authorization certificate provided to the user device when registering the user device with the service entity and/or the vehicle provider (e.g., a "birth" authorization certificate, etc.). In some implementations, the device authorization certificate is configured to authorize the user device to obtain the operational certificate.

In some implementations, the operations computing system, in response to obtaining the device authorization certificate, can provide the operational certificate to the user device. In such fashion, the operational certificate can be provided to the user device if the user device is previously "known" to the operations computing system (e.g., has been previously provided an authorization certificate, etc.), therefore ensuring that the user device is properly authorized before pairing the user device with the vehicle or the vehicle and one or more of the vehicle provider or the vehicle operator.

In some implementations, the operational certificate can be configured to expire after a certain amount of time. As an example, the operations computing system can obtain a device authorization certificate from the user computing device. In response, the operations computing system can provide an operational certificate that permits secure communication with the operations computing system for 24 hours. In such fashion, the operations computing system can provide time-limited operational certificates to significantly decrease the risk of a security failure associated with the operational certificate and/or the device authorization certificate.

At (510), the method 500A can include pairing the user device and the autonomous vehicle based at least in part on the device pairing request. For instance, an operations computing system (e.g., operations computing system 190A) can pair the vehicle with the user device. For instance, the operations computing system can store device pairing data indicative of an association between the computing device and the vehicle. Additionally, or alternatively, the operations computing system can store device pairing data indicative of an associated between the computing device and/or the vehicle, and the vehicle operator. More particularly, the operations computing system can store data that indicates a secure and authorized pairing between the multiple entities (e.g., the user device, the vehicle, the vehicle provider, the vehicle operator, etc.). The operations computing system can store the device pairing data in an associated memory (e.g., database, internal storage device, third-party or first-party cloud storage service, etc.). In some implementations, the device storage data can be temporally limited in the same manner as the operational certificate (e.g., can be valid for a specified amount of time, etc.).

In some implementations, the operations computing system can provide data indicative of the storage to the computing device for display at the user device through an application associated with the service entity. As an example, the user device can execute or otherwise can be executing an application configured to convey information regarding services of the service entity to passenger(s) and/or vehicle operator(s) of the vehicle (e.g., a trip duration, an estimated time of arrival, maintenance status, route information, visualizations of vehicle autonomy actions, etc.). The data can be sent to the application for display within the application. For example, after successfully storing the device pairing data, the operations computing system can provide data to the application executed by the user device that displays (e.g., via a display device, etc.) or otherwise provides (e.g., audibly, tactilely, etc.) an alert indicating that the pairing is complete. In such fashion, the vehicle provider, the vehicle operator, and/or passenger(s) of the vehicle can be alerted that the secure pairing and authorization between device and vehicle (and potentially the vehicle provider/vehicle operator) is successful.

In some implementations, the computing system and the application executed by the user device can both be associated with a service entity. As an example, the service entity can be the entity associated with the operations computing system, and can be a facilitator of vehicle services (e.g., vehicle transportation services, vehicle delivery services, etc.). Further, in some implementations, the application executed by the user device can be paired with the user device based at least in part on the device pairing request. As an example, the operations computing system can obtain the device pairing request via the application executed by the user device. The device pairing request can include the temporary pairing code, the operational certificate, and information regarding the application (e.g., cryptographic data identify information regarding the application, etc.). For example, the information may include a unique, secure identifier for the application. Based on the device pairing request, the operations computing system can pair the user device and the application executed by the user device. For example, the operations computing system can verify the information regarding the application (e.g., verifying signed cryptographic information, verifying a unique identifier, verifying that the application corresponds to the user device, etc.). After doing so, the operations computing system can store data indicative of an association between the user device and the application executed by the user device. In such fashion, the operations computing system can pair the user device and the application executed by the user device to ensure that only verified applications can access the operations computing system.

In some implementations, the operations computing system can determine that at least a portion of the vehicle pairing request corresponds to previously stored identification data. More particularly, the operations computing system can determine that the vehicle identification data and/or the vehicle provider identification data corresponds to previously stored data that indicates that the vehicle is "known" to the service entity (e.g., is authorized to facilitate provision of services for the service entity, etc.). As an example, the operations computing system can determine that the vehicle identification data corresponds to previously stored identification data for a vehicle owned by/dedicated to the service entity. As another example, the operations computing system can determine that the vehicle identification data corresponds to previously stored identification data for a vehicle owned by/dedicated to a third-party vehicle provider that is trusted by the service entity. As yet another example, the operations computing system may determine that vehicle operator identification data corresponds to previously stored identification data for a user (e.g., an employee, independent contractor, etc.) of the service entity or a third-party vehicle provider. In such fashion, the operations computing system can make a determination that the vehicle is known and previously established as secure by the service entity.

Figure 5B:
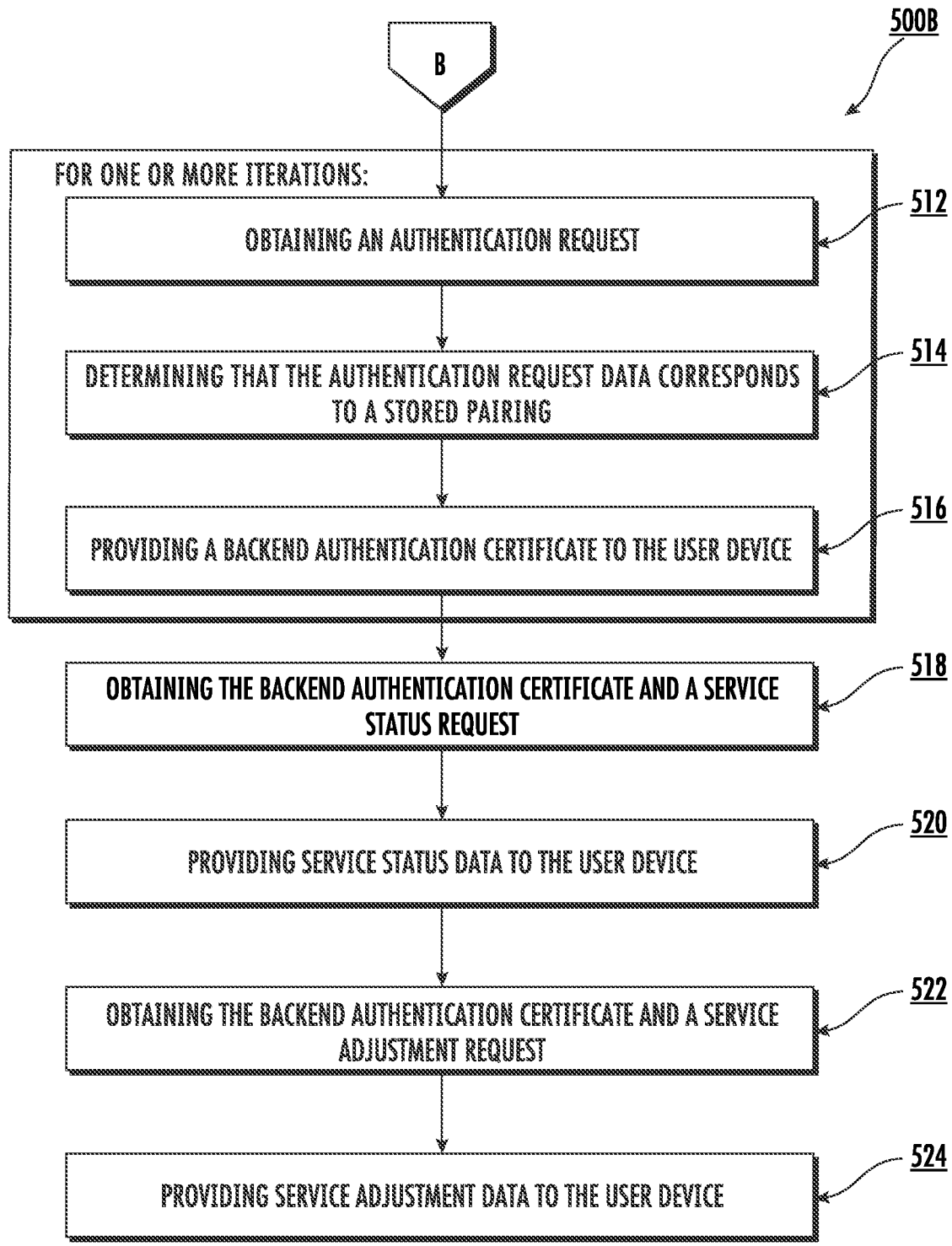
FIG. 5B depicts a flowchart diagram of an example method for authenticating and providing data to paired entities according to example embodiments of the present disclosure.

FIG. 5B depicts a flowchart diagram of an example method 500B for authenticating and providing data to paired entities according to example embodiments of the present disclosure. It should be noted that one or more portion(s) of the method 500B can be performed subsequently to and/or concurrently with one or more portions of the method 500A of FIG. 5A. As an example, portion 512 of the method 500B can directly follow the operations of portion 510 of the method 500A of FIG. 5A. Additionally, one or more portion(s) of the method 500B can be implemented by one or more computing devices such as, for example, the computing devices/systems described in FIGS. 1-4, 6 and 7. Moreover, one or more portion(s) of the method 500B can be implemented as an algorithm on the hardware components of the device(s) described herein (e.g., as in FIGS. 1-4, 6, and 7) to, for example, pair multiple entities. FIG. 5B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (512), the method 500B can include, for one or more iterations, obtaining an authentication request including the device identification data and the vehicle identification data. For instance, an operations computing system (e.g., operations computing system 190A) can obtain an authentication request via the application executed by the user device. The authentication request can include the device identification data and the vehicle identification data. Further, in some implementations, the authentication request can additionally, or alternatively, include the unique device identifier if included in the device pairing request. As an example, the authentication request can include vehicle identification data included in the vehicle pairing request, device identification data included in the device pairing request, and a unique device identifier included in the device pairing request.

At (514), the method 500B can include, for one or more iterations, determining that the authentication request data corresponds to a stored pairing between the user device and the autonomous vehicle. For instance, an operations computing system (e.g., operations computing system 190A) can determine that the authentication request data corresponds to a pairing of identification data that is stored in the operations computing system between the user device and the autonomous vehicle. More particularly, the operations computing system can determine that the combination of the vehicle and the user device accurately corresponds to the previously stored data associated with the identity of the user device and the vehicle indicative of an authorized pairing. As an example, prior to obtaining the authentication request, the operations computing system can store received vehicle identification data and device authentication data so that a pairing is stored between the vehicle and the user device (e.g., using a pairing service of the backend services 215, etc.). For example, the stored pairing can be or otherwise include a database entry for the vehicle identification data that includes a reference (e.g., a table reference, etc.) to the device identification data, and/or vice-versa. Additionally, in some implementations, the operations computing system can determine that the unique application identifier corresponds to a stored pairing between the application and the user device and/or the vehicle.

At (516), the method 500B can include, for one or more iterations, providing a backend authentication certificate to the user device. For instance, an operations computing system (e.g., operations computing system 190A) can provide a backend authentication certificate to the user device via an application executed by the user device. The backend authentication certificate can be based on the secure and authorized correspondence between the obtained data and the stored association. More particularly, once the authentication request data is determined to correspond to the stored pairing, the operations computing system can provide the backend authentication certificate to facilitate communication between the user device and backend services (e.g., backend services 215) of the operations computing system. As an example, the backend authentication certificate can be configured to provide access to a backend service of the operations computing system (e.g., one or more services of the operations computing system that are inaccessible through externally-facing interfaces without authorization, etc.). In such fashion, the operations computing system can iteratively "ping" the user device to confirm the security status of the device and allow the user device to utilize the backend authentication certificate to navigate through security services of the operations computing system (e.g., an edge gateway of the operations computing system configured to block unauthorized access to internal systems of the computing system, etc.).

At (518), the method 500B can include obtaining the backend authentication certificate and a service status request. For instance, an operations computing system (e.g., operations computing system 190A) can obtain the backend authentication certificate previously provided to the user device alongside a service status request from the user device via the application executed by the user device (e.g., using application programming interface(s) of the operations computing system, etc.). The service status request can be a request for a status of a service currently being provided by the vehicle and/or a service scheduled to be provided by the vehicle. The service provided by the vehicle can be any service offered by the service entity that can be provided by a vehicle provider (e.g., a delivery service, a transportation service, a pooled vehicle service, etc.). As an example, the service status request may request the status of a transportation service that is currently being provided by the vehicle. As another example, the service status request may request a pooled vehicle service, which can be utilized to concurrently fulfill a plurality of different vehicle service requests (e.g., a plurality of transportation services, a plurality of delivery services, a mixed plurality of both transportation and delivery services, etc.).

At (520), the method 500B can include providing service status data to the user device. For instance, an operations computing system (e.g., operations computing system 190A) can provide service status data to the user device (e.g., via the application executed by the user device, etc.). More particularly, the operations computing system can use its backend service to provide the service status to the user device and/or the application executed by the user device (e.g., facilitated by the backend authentication certificate provided by the user device, etc.). The service status data can describe any previous, current, and/or planned aspect of the service (e.g., mapping data for an area around a current location of the vehicle, the current location of the vehicle, a planned route of the vehicle, an estimated service completion time, a destination address, passenger directions, etc.). Further, the service status data can be configured for display at the user device in the same or a similar manner to the data indicative of the successful pairing (e.g., as a user interface element in the application associated with the service entity that is executed by the user device, etc.). As an example, the service status data may include a destination address and passenger directions configured to direct a passenger of the vehicle from a vehicle destination to a final passenger destination. For example, the passenger directions may be configured to direct a passenger of the vehicle from an airport drop-off point to a planned terminal of the airport. The vehicle service can provide service status data for a multimodal transportation service (e.g., a transportation service utilizing multiple modes of transportation, etc.). This can include information associated with one or more subsequent transportation legs of a multi-modal itinerary (e.g., aircraft information for an air transport leg, ground-based vehicle information for a subsequent ground-based vehicle leg, etc.). As another example, the service status data can include a current seating configuration of the vehicle, and can additionally include user interface elements to adjust one or more parameters of the seating configuration of the vehicle (e.g., adjusting an angle and/or position of seats, adjusting a second row of seats to a table configuration, etc.).

At (522), the method 500B can include obtaining a service adjustment request from the user device. For instance, an operations computing system (e.g., operations computing system 190A) can obtain a service adjustment request from the user device (e.g., via the application executed by the user device, etc.) alongside the backend authentication certificate (e.g., to authenticate the service adjustment request, etc.). The service adjustment request can be indicative of a service adjustment selected by a user (e.g., using one or more user interface elements provided by a service entity application executed on the user device, etc.).

More particularly, the service adjustment request can be indicative of a service adjustment desired by the user (e.g., selected by the user using a user interface of the application executed by the user device, etc.). As an example, the user interface of the application can provide a user input element for stopping the service facilitated by the service entity (e.g., a touchscreen "stop service" user input button, etc.). A service adjustment request can be generated by the application that indicates the desired adjustment selected by the user (e.g., to "stop the service). In such fashion, the user can select service adjustments (e.g., stopping a service, modifying a service, adding an additional service, contacting the service entity and/or vehicle provider, etc.) and the user's selected adjustments can be included in a service adjustment request and provided to the operations computing system (e.g., via the application executed by the user device, etc.).

At (524), the method 500B can include providing service adjustment data to the user device. For instance, an operations computing system (e.g., operations computing system 190A) can utilize a backend service (e.g., a backend service of backend services 215) to provide service adjustment data to the user device based at least in part on the service adjustment request (e.g., via the application executed by the user device, etc.). More particularly, the service adjustment data can be configured to adjust one or more aspects of the service provided by the vehicle in accordance with the service adjustments selected by the user (e.g., as indicated by the service adjustment request, etc.). The service adjustment data can include any adjustment that can be selected by a user for the service being provided (e.g., a service stop request, a destination modification request, a service support request, a service safety request, etc.). As an example, the service adjustment data may include an adjustment from a first destination to a second destination. As another example, the service adjustment data may include an adjustment that stops the vehicle along its current route. In such fashion, the vehicle service provided by the service entity and/or a vehicle provider associated with the service entity can be dynamically adjusted according to service adjustment requests of a user of the service.

After provision of the service adjustment data to the user device, the operations computing system can obtain data descriptive of a service adjustment implementation by the vehicle associated with the user device. More particularly, the user device can obtain the service adjustment data and can instruct the vehicle to implement the adjustments specified. Once the adjustments are completed, the user device can provide the implementation data to the operations computing system to successfully confirm implementation of the service adjustment(s). In such fashion, the operations computing system can determine whether the service adjustment was successfully implemented, and/or can provide additional service adjustment data to the user device as required.

As an example, the service adjustment data can be configured to stop the vehicle at a nearest stopping point. The user device can obtain the service adjustment data from the operations computing system and can instruct the vehicle (e.g., the vehicle computing system, etc.) to stop the vehicle at the nearest stopping point. The vehicle can implement these adjustments by stopping the vehicle as instructed. The user computing device can provide the data descriptive of the service adjustment implementation to the operations computing system. The operations computing system can determine that the service adjustment has been successfully implemented by the vehicle. Alternatively, the operations computing system can determine that the service adjustment has not been successfully implemented at the vehicle, and can take one or more corrective actions (e.g., querying the vehicle and/or user device for additional data, providing additional service adjustment data, querying a backend service of the operations computing system, etc.).

Figure 6:
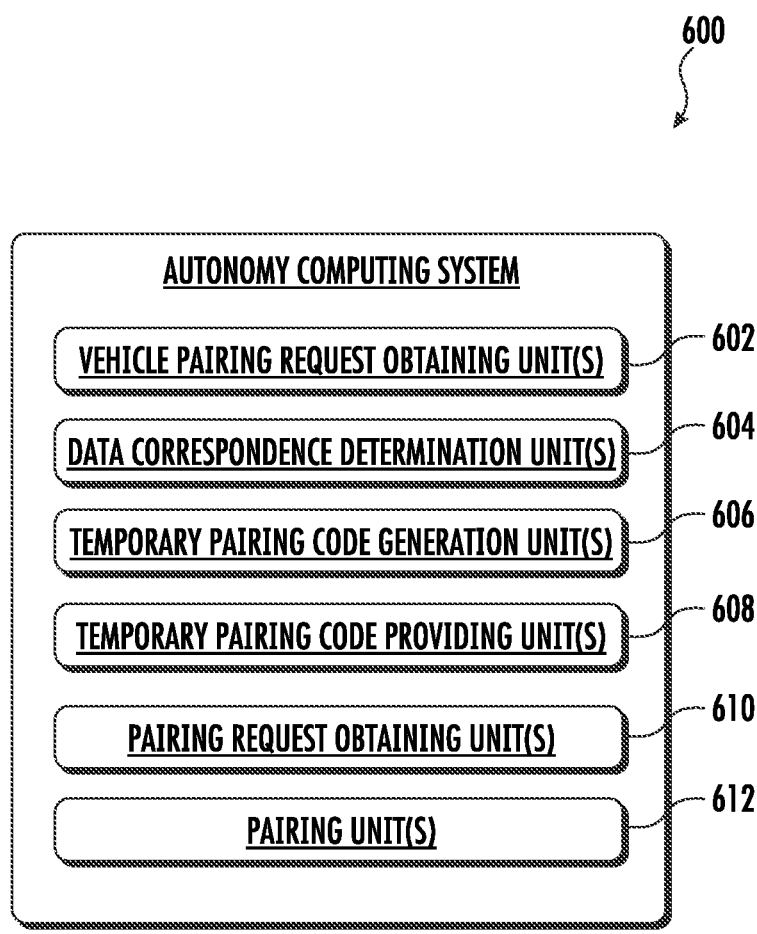
FIG. 6 depicts example units associated with a computing system for performing operations and functions according to example embodiments of the present disclosure.

Various means can be configured to perform the methods and processes described herein. FIG. 6 depicts example units associated with a computing system for performing operations and functions according to example embodiments of the present disclosure. As depicted, FIG. 6 depicts a computing system 600 that can include, but is not limited to, vehicle pairing request obtaining unit(s) 602; data correspondence determination unit(s) 604; temporary pairing code determination unit(s) 606; temporary pairing code providing unit(s) 608; pairing request obtaining unit(s) 610; and pairing unit(s) 612. In some implementations one or more units may be implemented separately. In some implementations, one or more units may be included in one or more other units.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means can be configured to obtain data (e.g., a vehicle pairing request) from a vehicle provider that includes identification data for a vehicle. A vehicle pairing request obtaining unit 602 is an example of means for obtaining vehicle pairing request data as described herein.

The means can be configured to determine a correspondence between vehicle identification data and stored identification data. For example, the means can be configured to determine that vehicle identification data corresponds to previously stored identification data assigned to a service request. A data correspondence determination unit 604 is one example of a means for determining a correspondence between vehicle identification data and stored identification data as described herein.

The means can be configured to determine a temporary pairing code. For example, the means can be configured to determine, based at least in part on the vehicle identification data, a temporary pairing code associated with the vehicle. A temporary pairing code determination unit 606 is one example of a means for determining a temporary pairing code as described herein.

The means can be configured to provide a temporary pairing code. For example, the means can be configured to provide, to a vehicle provider, the temporary pairing code. A temporary pairing code providing unit 608 is one example of a means for providing a temporary pairing code as described herein.

The means can be configured to obtain a pairing request. For example, the means can be configured to obtain a device pairing request via an application executed by a user device. The pairing request can include the temporary pairing code and an operational certificate that includes device identification data associated with the user device. A pairing request obtaining unit 610 is one example of a means for obtaining a pairing request as described herein.

The means can be configured to pair the user device and the vehicle. For example, the means can be configured to pair the vehicle and the user device based on the device pairing request by storing pairing data indicative of an association between the user device and the vehicle. A pairing unit 612 is one example of a means for pairing a user device and a vehicle as described herein.

Figure 7:
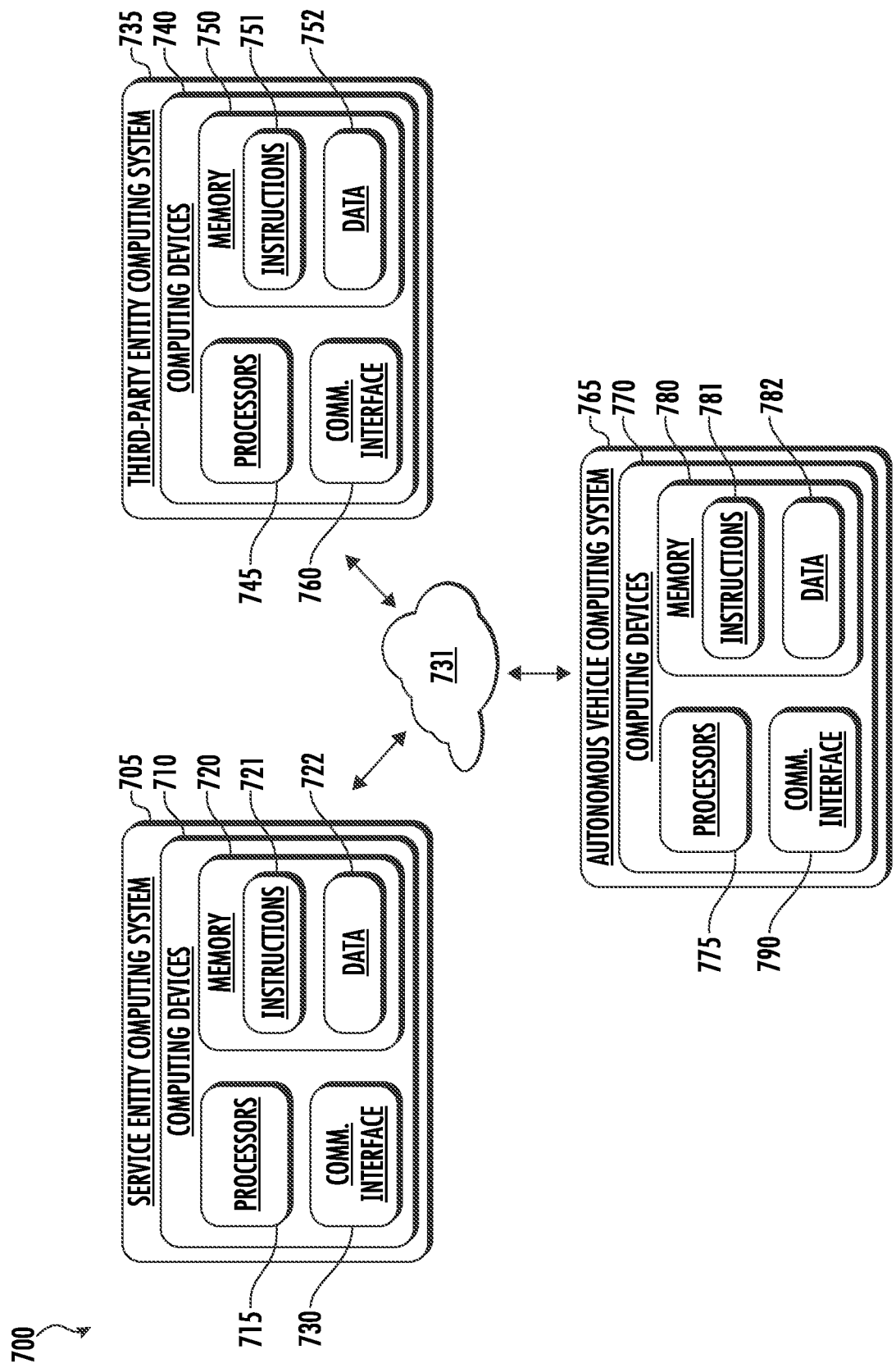
FIG. 7 depicts example system components of an example system according to example embodiments of the present disclosure.

FIG. 7 depicts example system components of an example system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include a service entity computing system 705 (e.g., that is associated with a service entity). The service entity computing system 705 can represent/correspond to service entity computing system(s) described herein (e.g., service entity operations computing system 190A, etc.). The example system 700 can include a third-party entity computing system 735 (e.g., that is associated with a third-party entity). The third-party entity computing system 735 can represent/correspond to the third-party entity computing systems described herein (e.g., remote computing system(s) 190B, other system(s)/platform(s) 250, vehicle provider computing systems 245A/245B, etc.). The example system 700 can include an autonomous vehicle computing system 765 (e.g., that is onboard an autonomous vehicle). The autonomous vehicle computing system 765 can represent/correspond to the autonomous vehicle computing system 110 described herein. The service entity computing system 705, the third-party entity computing system 735, and the autonomous vehicle computing system 765 can be communicatively coupled to one another over one or more communication network(s) 731. The networks 731 can correspond to any of the networks described herein, such as communication network(s) 120.

The computing device(s) 710 of the service entity computing system 705 can include processor(s) 715 and a memory 720. The one or more processors 715 can be any suitable processing device (e.g., a processor core, a microprocessor, an ASIC, a FPGA, a controller, a microcontroller, etc.) and can be one processor or a plurality of processors that are operatively connected. The memory 720 can include one or more non-transitory computer-readable storage media, such as RAM, ROM, EEPROM, EPROM, one or more memory devices, flash memory devices, data registrar, etc., and combinations thereof.

The memory 720 can store information that can be accessed by the one or more processors 715. For example, the memory 720 (e.g., one or more non-transitory computer-readable storage mediums, memory devices) can include computer-readable instructions 721 that can be executed by the one or more processors 715. The instructions 721 can be software written in any suitable programming language or can be implemented in hardware. Additionally, or alternatively, the instructions 721 can be executed in logically and/or virtually separate threads on processor(s) 715.

For example, the memory 720 can store instructions 721 that when executed by the one or more processors 715 cause the one or more processors 715 (the service entity computing system 705) to perform operations such as any of the operations and functions of the service entity computing system (or for which it is configured), one or more of the operations and functions for communicating between a third-party entity and/or a service entity and/or an autonomous vehicle, one or more portions of methods 500A and 500B, and/or one or more of the other operations and functions of the computing systems described herein.

The memory 720 can store data 722 that can be obtained (e.g., acquired, received, retrieved, accessed, created, stored, etc.). The data 722 can include, for example, data associated with communications (e.g., messages, calls, callbacks, etc.), data associated with software package(s) (e.g., Cloud SDK data), data associated with one or more backends, data associated with an API platform, batched data, data associated with VIDs (e.g., vehicle identification data corresponding to a third-party vehicle provider), data associated with vehicle registration (e.g., vehicle identification data, etc.), data associated with a registration authority, data associated with a pairing authority (e.g., pairing of vehicles, users, devices, vehicle operators, applications, etc.), data associated with device(s) of a vehicle or associated with the vehicle and/or applications executed by the device(s) (e.g., device identification data, unique application identifier(s), etc.), data associated with a certificate authority (e.g., backend certificates, etc.), data associated with security certificates, data associated with autonomous vehicles, data associated with third-party entities, sensor data, map data, vehicle state data, vehicle location data, perception data, prediction data, motion planning data, data associated with a vehicle client, data associated with a communication network, data associated with an API, data associated with a library, data associated with user interfaces, data associated with user input, and/or other data/information such as, for example, that described herein. In some implementations, the computing device(s) 710 can obtain data from one or more memories that are remote from the service entity computing system 705.

More particularly the memory 720 can include stored data (e.g., data 722) that is indicative of pairing(s) between multiple entities. As an example, the memory 720 can include stored data 722 that includes links and/or references (e.g., in a database platform, etc.) between stored device identification data, unique application identifier(s), vehicle identification data, and/or any other data indicative of an identity of an entity. As such, retrieval of any identification data 722 stored in the memory 720 can facilitate retrieval of stored data indicative of a pairing between the entity associated with the identification data 722 and additional entity(s).

The computing device(s) 710 can also include a communication interface 730 used to communicate with one or more other system(s) on-board an autonomous vehicle and/or remote from the service entity computing system, such as third-party entity computing system 735 and an autonomous vehicle computing system 765. The communication interface 730 can include any circuits, components, software, etc. for communicating via one or more networks (e.g., network(s) 731). The communication interface 730 can include, for example, one or more of a communications controller, receiver, transceiver, transmitter, port, conductors, software and/or hardware for communicating data.

The third-party entity computing system 735 can include one or more computing device(s) 740 that are remote from the service entity computing system 705 and/or the autonomous vehicle computing system 765. The computing device(s) 740 can include one or more processors 745 and a memory 750. The one or more processors 745 can be any suitable processing device (e.g., a processor core, a microprocessor, an ASIC, a FPGA, a controller, a microcontroller, etc.) and can be one processor or a plurality of processors that are operatively connected. The memory 750 can include one or more tangible, non-transitory computer-readable storage media, such as RAM, ROM, EEPROM, EPROM, one or more memory devices, flash memory devices, data registrar, etc., and combinations thereof.

The memory 750 can store information that can be accessed by the one or more processors 745. For example, the memory 750 (e.g., one or more tangible, non-transitory computer-readable storage media, one or more memory devices, etc.) can include computer-readable instructions 751 that can be executed by the one or more processors 745. The instructions 751 can be software written in any suitable programming language or can be implemented in hardware. Additionally, or alternatively, the instructions 751 can be executed in logically and/or virtually separate threads on processor(s) 745.

For example, the memory 750 can store instructions 751 that when executed by the one or more processors 745 cause the one or more processors 745 to perform operations such as any of the operations and functions of the third-party entity computing system (or for which it is configured), one or more of the operations and functions for communicating between a third-party entity and/or a service entity and/or an autonomous vehicle, one or more portions of methods 500A and 500B, and/or one or more of the other operations and functions of the computing systems described herein.

The memory 750 can store data 752 that can be obtained. The data 752 can include, for example, data associated with communications (e.g., messages, calls, callbacks, etc.), data associated with software package(s) (e.g., Cloud SDK data), data associated with one or more backends, data associated with an API platform, batched data, data associated with VIDs, data associated with vehicle registration (e.g., registration of a vehicle with the third-party entity, etc.), data associated with a registration authority, data associated with a certificate authority, data associated with security certificates, data associated with autonomous vehicles, data associated with third-party entities, data of an associated vehicle fleet, sensor data, map data, vehicle state data, vehicle location data, perception data, prediction data, motion planning data, data associated with a vehicle client, data associated with a communication network, data associated with an API, data associated with a library, data associated with user interfaces, data associated with user input, and/or other data/information such as, for example, that described herein.

The computing device(s) 740 can also include a communication interface 760 used to communicate with one or more system(s) onboard an autonomous vehicle and/or another computing device that is remote from the system 735, such as autonomous vehicle computing system 765 and service entity computing system 705. The communication interface 760 can include any circuits, components, software, etc. for communicating via one or more networks (e.g., network(s) 731). The communication interface 760 can include, for example, one or more of a communications controller, receiver, transceiver, transmitter, port, conductors, software and/or hardware for communicating data.

The autonomous vehicle computing system 765 can include one or more computing device(s) 770 that are remote from the service entity computing system 705 and the third-party entity computing system 735. The computing device(s) 770 can include one or more processors 775 and a memory 780. The one or more processors 775 can be any suitable processing device (e.g., a processor core, a microprocessor, an ASIC, a FPGA, a controller, a microcontroller, etc.) and can be one processor or a plurality of processors that are operatively connected. For example, the autonomous vehicle computing system 765 may be or otherwise include a user device as described previously. The memory 780 can include one or more tangible, non-transitory computer-readable storage media, such as RAM, ROM, EEPROM, EPROM, one or more memory devices, flash memory devices, data registrar, etc., and combinations thereof.

The memory 780 can store information that can be accessed by the one or more processors 775. For example, the memory 780 (e.g., one or more tangible, non-transitory computer-readable storage media, one or more memory devices, etc.) can include computer-readable instructions 781 that can be executed by the one or more processors 775. The instructions 781 can be software written in any suitable programming language or can be implemented in hardware. Additionally, or alternatively, the instructions 781 can be executed in logically and/or virtually separate threads on processor(s) 775.

For example, the memory 780 can store instructions 781 that when executed by the one or more processors 775 cause the one or more processors 775 to perform operations such as any of the operations and functions of the autonomous vehicle computing system (or for which it is configured), one or more of the operations and functions for communicating between a third-party entity and/or a service entity and/or an autonomous vehicle, one or more portions of methods 500A and 500B, and/or one or more of the other operations and functions of the computing systems described herein.

The memory 780 can store data 782 that can be obtained. The data 782 can include, for example, data associated with communications (e.g., messages, calls, callbacks, etc.), data associated with software package(s) (e.g., Cloud SDK data), data associated with one or more backends, data associated with an API platform, batched data, data associated with VIDs, data associated with vehicle registration (e.g., vehicle identification data, etc.), data associated with a registration authority, data associated with a certificate authority, data associated with security certificates, data associated with autonomous vehicles, data associated with device(s) of vehicle or associated with the vehicle and/or applications executed by the device(s) (e.g., device identification data, unique application identifier(s), etc.), data associated with third-party entities, sensor data, map data, vehicle state data, vehicle location data, perception data, prediction data, motion planning data, data associated with a vehicle client, data associated with a telecommunication network, data associated with an API, data associated with a library, data associated with user interfaces, data associated with user input, and/or other data/information such as, for example, that described herein.

The computing device(s) 770 can also include a communication interface 790 used to communicate with one or more system(s) onboard a vehicle and/or another computing device that is remote from the system 765, such as third-party entity computing system 735 and/or service entity computing system 705. The communication interface 790 can include any circuits, components, software, etc. for communicating via one or more networks (e.g., network(s) 731). The communication interface 790 can include, for example, one or more of a communications controller, receiver, transceiver, transmitter, port, conductors, software and/or hardware for communicating data.

The network(s) 731 can be any type of network or combination of networks that allows for communication between devices. In some implementations, the network(s) 731 can include one or more of a local area network, wide area network, the Internet, secure network, cellular network, mesh network, peer-to-peer communication link and/or some combination thereof and can include any number of wired or wireless links. Communication over the network(s) 731 can be accomplished, for example, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
obtaining, by a computing system comprising one or more computing devices, a first entity pairing request for a first entity associated with a service entity, the first entity pairing request comprising first entity identification data;
determining, by the computing system based at least in part on the first entity identification data, a temporary pairing code associated with the first entity;
providing, by the computing system, the temporary pairing code to the service entity;
obtaining, by the computing system, a second entity pairing request for a second entity associated with the service entity, the second entity pairing request comprising the temporary pairing code and an operational certificate, the operational certificate comprising second entity identification data associated with the second entity; and
pairing, by the computing system, the second entity and the first entity based at least in part on the second entity pairing request.

2. The computer-implemented method of claim 1, wherein the computing system is associated with the service entity, and wherein the service entity is associated with provision of vehicle transportation services.

3. The computer-implemented method of claim 1, wherein the first entity pairing request further comprises service entity identification data, and wherein the method further comprises:
determining, by the computing system, that at least one of the first entity identification data or the service entity identification data corresponds to previously stored identification data; and
wherein pairing, by the computing system, the second entity and the first entity comprises storing, by the computing system based at least in part on the second entity pairing request, second entity pairing data indicative of an association between the second entity, the first entity, and the service entity.

4. The computer-implemented method of claim 1, wherein the first entity pairing request further comprises first entity operator identification data, wherein the first entity operator identification data is configured to identify a human operator of the first entity, and wherein the method further comprises:
determining, by the computing system, that the first entity identification data and the first entity operator identification data corresponds to previously stored identification data; and wherein pairing, by the computing system, the second entity and the first entity comprises storing, by the computing system based at least in part on the second entity pairing request, second entity pairing data indicative of an association between the second entity, the first entity, and the human operator.

5. The computer-implemented method of claim 1, wherein the method further comprises:
obtaining, by the computing system, a second entity authorization certificate for the second entity associated with the service entity; and
providing, by the computing system, the operational certificate to the second entity.

6. The computer-implemented method of claim 5, wherein the operational certificate is configured to expire after a specified amount of time.

7. The computer-implemented method of claim 5, wherein:
the second entity authorization certificate is provided by the computing system to the second entity prior to generating the temporary pairing code associated with the first entity; and
the second entity authorization certificate is configured to authorize the second entity to obtain the operational certificate.

8. The computer-implemented method of claim 1, wherein the method further comprises:
for one or more iterations:
obtaining, by the computing system, authentication request data for the second entity associated with the service entity, the authentication request data comprising the second entity identification data and the first entity identification data;
determining, by the computing system, that the authentication request data corresponds to a stored pairing between the second entity and the first entity; and
providing, by the computing system, a backend authentication certificate to the second entity, the backend authentication certificate configured to provide access to a backend service of the computing system.

9. The computer-implemented method of claim 8, wherein the method further comprises:
obtaining, by the computing system for the second entity associated with the service entity, the backend authentication certificate and a service status request for a status of a first entity service currently assigned to the first entity.

10. The computer-implemented method of claim 9, wherein the first entity service comprises at least one of:
a delivery service;
a transportation service; or
a pooled first entity service.

11. The computer-implemented method of claim 9, wherein the method further comprises providing, by the computing system, service status data to the second entity using at least the backend service of the computing system, wherein the service status data is configured to be displayed by an application executed by the second entity.

12. The computer-implemented method of claim 11, wherein the service status data comprises at least one of:
a current location of the first entity;
mapping data for at least a subset of a geographic region the first entity is currently located in;
at least a portion of a planned route for the first entity;
an estimated service completion time;
a destination address; or
passenger directions configured to direct a passenger of the first entity from a first entity destination to a final passenger destination.

13. The computer-implemented method of claim 8, wherein:
the service entity comprises a vehicle provider; and
the first entity comprises a first autonomous vehicle.

14. The computer-implemented method of claim 13, wherein the second entity comprises at least one of a second autonomous vehicle or an application executed by a user device.

15. The computer-implemented method of claim 14, wherein one or more of the first entity and the second entity are associated with at least one of the vehicle provider or a third-party vehicle provider that offers its vehicles to the service entity.

16. A computing system, comprising:
one or more processors; and
one or more tangible, non-transitory, computer readable media that collectively store instructions that when executed by the one or more processors cause the computing system to perform operations, the operations comprising:
obtaining a first entity pairing request for a first entity associated with a service entity, the first entity pairing request comprising first entity identification data;
determining that the first entity identification data corresponds to previously stored identification data;
determining, based at least in part on the first entity identification data, a temporary pairing code associated with the first entity for which the first entity identification data corresponds to previously stored identification data;
providing the temporary pairing code to the service entity;
obtaining a second entity pairing request for a second entity associated with the service entity, the second entity pairing request comprising the temporary pairing code and second entity identification data associated with the second entity; and
pairing the second entity and the first entity based at least in part on the second entity pairing request.

17. The computing system of claim 16, wherein providing the temporary pairing code to the service entity further comprises:
obtaining a second entity authorization certificate via the second entity; and
providing an operational certificate to the second entity, wherein the operational certificate comprises the second entity identification data associated with the second entity,
wherein the second entity pairing request comprises the temporary pairing code and the operational certificate.

18. The computing system of claim 17, wherein the operational certificate is configured to expire after a specified amount of time.

19. The computing system of claim 16, wherein a second entity authorization certificate is provided by the computing system to the second entity prior to generating the temporary pairing code associated with the first entity and the second entity authorization certificate is configured to authorize the second entity to obtain an operational certificate;
wherein the computing system further comprises a backend service configured to facilitate authorized communication between one or more second entities and the computing system; and
the operations further comprise, for one or more iterations:
obtaining authentication request data from the second entity, the authentication request data comprising the second entity identification data and the first entity identification data;
determining that the authentication request data corresponds to stored data indicative of the pairing between the second entity and the first entity; and
providing a backend authentication certificate to the second entity, the backend authentication certificate configured to provide access to the backend service of the computing system.

20. One or more tangible, non-transitory, computer readable media that collectively store instructions that when executed by one or more processors cause the one or more processors to perform operations, the operations comprising:
obtaining a first entity pairing request for a first entity associated with a service entity, the first entity pairing request comprising first entity identification data;
determining, based at least in part on the first entity identification data, a temporary pairing code associated with the first entity;
providing the temporary pairing code to the service entity;
obtaining a second entity pairing request from a second entity, the second entity pairing request comprising the temporary pairing code and an operational certificate, the operational certificate comprising second entity identification data associated with the second entity;
pairing the second entity and the first entity based at least in part on the second entity pairing request; and
for one or more iterations:
obtaining authentication request data from the second entity, the authentication request data comprising the second entity identification data and the first entity identification data;
determining that the authentication request data corresponds to a stored pairing between the second entity and a first entity; and
providing a backend authentication certificate to the second entity, the backend authentication certificate configured to provide access to a backend service of a computing system.

* * * * *